US011539895B1

(12) United States Patent
Seets et al.

(10) Patent No.: US 11,539,895 B1
(45) Date of Patent: Dec. 27, 2022

(54) SYSTEMS, METHODS, AND MEDIA FOR MOTION ADAPTIVE IMAGING USING SINGLE-PHOTON IMAGE SENSOR DATA

(71) Applicant: WISCONSIN ALUMNI RESEARCH FOUNDATION, Madison, WI (US)

(72) Inventors: Trevor Seets, Madison, WI (US); Atul Ingle, Madison, WI (US); Andreas Velten, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 0 days.

(21) Appl. No.: 17/485,978

(22) Filed: Sep. 27, 2021

(51) Int. Cl.
*H04N 5/235* (2006.01)
(52) U.S. Cl.
CPC ................ *H04N 5/2351* (2013.01)
(58) Field of Classification Search
CPC .. H04N 5/2351; H04N 5/2352; H04N 5/2354; H04N 5/2355; H04N 5/2356; H04N 5/235; H04N 5/23229
See application file for complete search history.

(56) References Cited

U.S. PATENT DOCUMENTS

| | | | | |
|---|---|---|---|---|
| 9,210,350 | B2 * | 12/2015 | Dai | H04N 5/378 |
| 10,200,572 | B1 * | 2/2019 | Fotland | G06T 7/246 |
| 2015/0312463 | A1 * | 10/2015 | Gupta | H04N 5/2355 348/239 |
| 2016/0373676 | A1 * | 12/2016 | Zhang | H04N 5/332 |
| 2021/0319606 | A1 | 10/2021 | Gupta et al. | |

OTHER PUBLICATIONS

Brandli et al., A 240 x 180 130 dB 3 μs Latency Global Shutter Spatiotemporal Vision Sensor, IEEE Journal of Solid-State Circuits, 2014, 49(10):2333-2341.
Evangelidis et al., Parametric Image Alignment Using Enhanced Correlation Coefficient Maximization, IEEE Transactions on Pattern Analysis and Machine Intelligence, 2008, 30(10):1858-1865.
Fossum et al., The Quanta Image Sensor: Every Photon Counts, Sensors, 2016, 16(8):1260, 25 pages.

(Continued)

*Primary Examiner* — Luong T Nguyen
(74) *Attorney, Agent, or Firm* — Quarles & Brady LLP

(57) ABSTRACT

In accordance with some embodiments, systems, methods, and media for motion adaptive imaging using single-photon image sensor data are provided. In some embodiments, the system comprises: an image sensor comprising single-photon detectors in an array; a processor programmed to: receive a sequence of photon frames, each comprising pixels having a value indicative of whether a photon was received during a frame period, each of the pixels corresponds to a pixel location; identify, for each of the pixel locations, changepoints, each indicative of a change in scene brightness; identify a photon frame in the sequence at which at least a threshold change in brightness has occurred based on the changepoints associated with each of the plurality of pixel locations; and generate a series of changepoint frames, wherein each changepoint frame is based on estimated brightness associated with each pixel location at a point in the sequence of photon frames.

20 Claims, 11 Drawing Sheets

(56) References Cited

OTHER PUBLICATIONS

Gallego et al., Event-based Vision: A Survey, Accepted for Publication at the IEEE Transactions on Pattern Analysis and Machine Intelligence, 2020, arXiv:1904.08405v3, 30 pages.
Gehring et al., EKLT: Asynchronous Photometric Feature Tracking Using Events and Frames, International Journal of Computer Vision, Published Online Aug. 22, 2019, 18 pages.
Gyongy et al., Object Tracking and Reconstruction with a Quanta Image Sensor, Paper Presented at International mage Sensor Workshop, 2017, 5 pages.
Gyongy et al., Single-Photon Tracking for High-Speed Vision, Sensors, 2018, 18:323, 14 pages.
Hasinoff et al., Burst Photography for High Dynamic Range and Low-Light Imaging on Mobile Cameras, ACM Transactions on Graphics, 2016, 35(6):1-12.
Killick et al., Optimal Detection of Changepoints with a Linear Computational Cost, arXIV:1101.1438v3, Oct. 9, 2012, 25 pages.
Ma et al., Quanta Burst Photography, ACM Trans. Graph, 2020, vol. 39, No. 4, Article 79, pp. 1-16.
Stoffregen et al., Event-Based Motion Segmentation by Motion Compensation, Accepted for Publication at the IEEE International Conference on Computer Vision, 2019, 19 pages.
Truong et al., Ruptures: Change Point Detection in Python, arXiv: 1801.00826, Jan. 2, 2018, 5 pages.

\* cited by examiner

"Fan" Scene

SYSTEMS, METHODS, AND MEDIA FOR MOTION ADAPTIVE IMAGING USING SINGLE-PHOTON IMAGE SENSOR DATA

STATEMENT REGARDING FEDERALLY SPONSORED RESEARCH

This invention was made with government support under HR0011-16-C-0025 awarded by the DOD/DARPA and under 1846884 awarded by the National Science Foundation. The government has certain rights in the invention.

CROSS-REFERENCE TO RELATED APPLICATIONS

N/A

BACKGROUND

When imaging dynamic scenes with a conventional camera, the finite exposure time of the camera sensor results in motion blur. This blur can be due to motion in the scene or motion of the camera. Such blur can cause the images of a dynamic scene generated by the conventional camera to be relatively low quality for viewing by a user and for machine vision tasks. One solution to this problem is to simply lower the exposure time of the camera. However, this leads to noisy images, especially in low light conditions.

Accordingly, new systems, methods, and media for motion adaptive imaging using single-photon image sensor data are desirable.

SUMMARY

In accordance with some embodiments of the disclosed subject matter, systems, methods, and media for motion adaptive imaging using single-photon image sensor data are provided.

In accordance with some embodiments of the disclosed subject matter, a system for generating digital images is provided, the system comprising: an image sensor comprising a plurality of detectors configured to detect arrival of photons, the plurality of detectors arranged in an array; at least one processor that is programmed to: receive, from the image sensor, a series of images, each image in the series of images comprising a plurality of pixels representing brightness of a portion of a scene, each of the plurality of pixels associated with a pixel location (x,y); identify, for each of the plurality pixel locations using the series of images, one or more changepoints at which brightness associated with the pixel transitions between different steady state brightness values; determine, based on changepoints associated with the plurality of pixel locations, a first point in the series of images at which at least a threshold portion of pixel locations have included a changepoint; generate a first image based on brightness associated with each pixel location at the first point in the series of images; determine, based on changepoints associated with the plurality of pixel locations, a second point in the series of images at which at least the threshold portion of pixel locations have included a changepoint; and generate a second image based on brightness associated with each pixel location at the second point in the series of images.

In some embodiments, each of the plurality of detectors is a single-photon avalanche diode (SPAD).

In some embodiments, each SPAD is configured to record a timestamp at which a single photon was detected.

In some embodiments, the at least one processor is further programmed to: estimate, for each of the plurality pixel locations using the series of images, a single brightness value between consecutive changepoints; and generate the first image based on the estimated single brightness value for each pixel location at the first point in the series of images.

In some embodiments, the at least one processor is further programmed to: determine motion between at least a portion of the first image and at least a portion of the second image.

In some embodiments, the at least one processor is further programmed to: generate a deblurred image based on the motion between the first image and the second image and pixel values of each of the series of images.

In some embodiments, the at least one processor is further programmed to: generate an upsampled image based on the motion between the first image and the second image and pixel values of each of the series of images.

In some embodiments, the at least one processor is further programmed to: provide the first image and the second image to a machine learning model.

In some embodiments, the threshold portion of pixel locations is at least one percent of pixel locations.

In accordance with some embodiments of the disclosed subject matter, a method for generating digital images is provided, the method comprising: receiving, from an image sensor comprising a plurality of detectors configured to detect arrival of photons, a series of images, each image in the series of images comprising a plurality of pixels representing brightness of a portion of a scene, each of the plurality of pixels associated with a pixel location (x,y); identifying, for each of the plurality pixel locations using the series of images, one or more changepoints at which brightness associated with the pixel transitions between different steady state brightness values; determining, based on changepoints associated with the plurality of pixel locations, a first point in the series of images at which at least a threshold portion of pixel locations have included a changepoint; generating a first image based on brightness associated with each pixel location at the first point in the series of images; determine, based on changepoints associated with the plurality of pixel locations, a second point in the series of images at which at least the threshold portion of pixel locations have included a changepoint; and generate a second image based on brightness associated with each pixel location at the second point in the series of images.

In accordance with some embodiments of the disclosed subject matter, a system for generating digital images is provided, the method comprising: an image sensor comprising a plurality of single-photon detectors configured to detect arrival of photons, the plurality of detectors arranged in an array; at least one processor that is programmed to: receive a sequence of photon frames, each photon frame comprising a plurality of pixels having a value indicative of whether a photon was received during a frame period associated with the photon frame, wherein each of the plurality of pixels corresponds to a pixel location of a plurality of pixel locations; identify, for each of the plurality of pixel locations, a plurality of changepoints, each of the plurality of changepoints is indicative of a change in scene brightness; identify a photon frame in the sequence of photon frames at which at least a threshold change in brightness has occurred based on the changepoints associated with each of the plurality of pixel locations; and generate a series of changepoint frames, wherein each changepoint frame is based on estimated brightness associated with each pixel location at a point in the sequence of photon frames.

In some embodiments, the at least one processor that is further programmed to: identify each of plurality of changepoints using no information from photon frames following a photon frame corresponding to the respective changepoint in the sequence.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
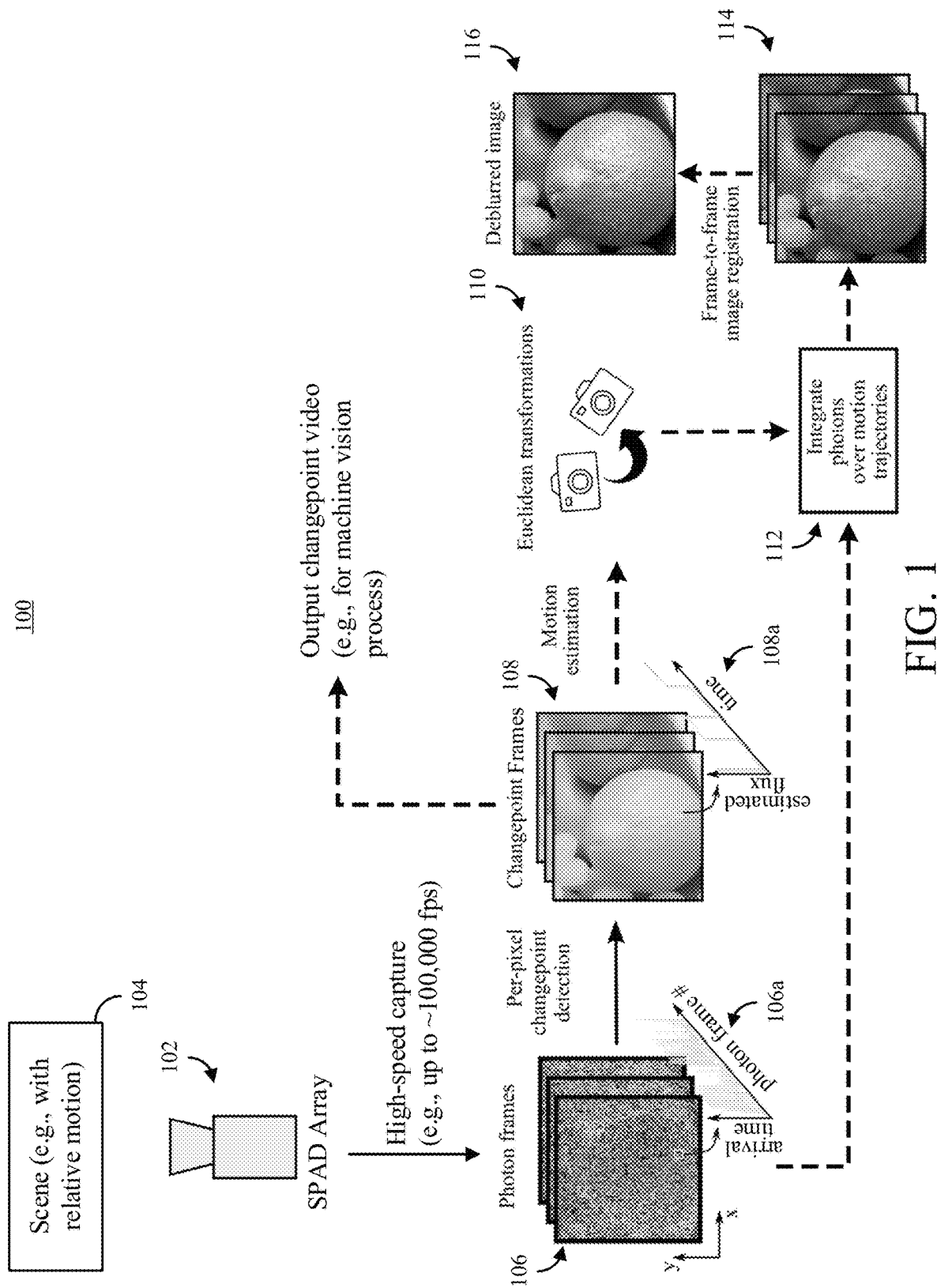
FIG. 1 shows an example of a flow for motion adaptive imaging using single-photon image sensor data in accordance with some embodiments of the disclosed subject matter.

In accordance with various embodiments, mechanisms (which can, for example, include systems, methods, and media) for motion adaptive imaging using single-photon image sensor data are provided.

In some embodiments, mechanisms described herein can utilize single photon sensors, such as single-photon avalanche diodes (SPADs) and quanta image sensor (QIS) (e.g., as described in Fossum et al., "The quanta image sensor: Every photon Counts," Sensors, (2016)), to capture high temporal resolution brightness information in various areas of the scene (e.g., on a per pixel level), and can use the brightness information to quantify motion in the scene. In some embodiments, mechanisms described herein can generate image data representing a relatively static period of time in the scene based on information about motion in the scene derived from the high temporal resolution brightness information.

As described above, in some embodiments, mechanisms described herein can be use SPADs to generate relatively high temporal resolution brightness data. SPADs are a rapidly developing image sensing technology that can be exhibit extreme low-light sensitivity and picosecond timing resolution. SPADs can be used in applications such as light detection and ranging (LiDAR), non-line-of-sight imaging, and fluorescence microscopy that operate in photon-starved scenarios. In some embodiments, mechanisms described herein can use the high light sensitivity and timing resolution of SPADs to generate image data for scenes under various imaging conditions, including dynamic scenes in a passive imaging setting with low illumination conditions (e.g., scenes for which conventional digital imaging is challenging).

In some embodiments, data captured by an image sensor implemented to detect the arrival of individual photons (e.g., a SPAD array sensor, a QIS) can be represented as a 3D spatio-temporal tensor of photon detection events which can be integrated along arbitrary spatio-temporal trajectories with dynamically varying integration windows, which can be defined based on scene motion.

In some embodiments, mechanisms described herein can be used to estimate pixel motion from photon timestamp data and dynamically adapt integration windows to reduce (e.g., minimize motion blur). As described below, simulation results show the applicability of techniques described herein to a variety of motion profiles including translation, rotation, and local object motion.

In some embodiments, mechanisms described herein can address trade-offs between noise and motion blur due to scene motion during image capture. For example, mechanisms described herein can be used to generate images with improved image quality in challenging scenarios, such as capturing images in low light, with fast moving objects.

Light is fundamentally discrete and can be measured in terms of photons. Conventional camera pixels measure brightness by first converting incident photon energy into an analog quantity (e.g., photocurrent, or charge) that is then measured and digitized. When imaging in low light levels using conventional image sensor technologies, much of the information present in the incident photons is lost due to electronic noise inherent in the analog-to-digital conversion and readout process. Unlike conventional image sensor pixels that require 100's-1000's of photons to produce a meaningful signal, SPADs are sensitive down to individual photons. A SPAD pixel can generate a signal indicative of a photon arrival at a particular time, with a time resolution on the order of hundreds of picoseconds (e.g., a photon arrival time can be recorded within an accuracy of hundreds of picoseconds). For example, a SPAD pixel can be configured to record a timestamp corresponding to a time at which arrival of a photon was detected by the SPAD. When the arrival of a single pixel can be recorded with sufficient accuracy, each photon detection can be seen as an instantaneous event free from any motion blur, as the photon left an object (e.g., by reflection or emission) at a particular moment in time, and corresponds to a particular spatial location of the object at that moment in time. Such sensitivity has the potential to facilitate imaging in low light, and/or imaging at very high frame rates where each image frame is photon-starved.

The information captured by a SPAD-based sensor is thus quite different than a conventional camera: in addition to two spatial dimensions (e.g., the two-dimensional projection of the scene onto the image sensor), a SPAD-based sensor can also be configured to capture data on a high resolution time axis. In some embodiments, SPAD data in two spatial dimensions and one time dimension can be used to generate a three dimensional (3D) spatio-temporal tensor of photon detection events (e.g., 2 spatial dimensions plus 1 time dimension). In some embodiments, a 3D spatio-temporal tensor can be used to mitigate difficulties caused by the noise-blur trade-off. For example, in some embodiments, data indicative of photon arrival times can be combined dynamically, across space and time, when estimating scene brightness. In a more particular example, if the scene motion is known prior to image processing, photons can be accumulated along corresponding spatio-temporal trajectories to create an image with no motion blur. A conventional camera does not have this property because at capture time high frequency components are lost. So even if scene motion is known, image deblurring becomes an ill-posed inverse problem.

In some embodiments, mechanisms described herein can generate dynamically changing exposure times, where each pixel can have a corresponding set of exposure times. For example, mechanisms described herein can use statistical changepoint detection to infer points in time where the photon flux at a given pixel changes from one steady state rate to another (e.g., as an object that was present at the point in the scene corresponding to that pixel moves relative to the image sensor). Inferring such points can facilitate selection of exposure times that adapt to scene motion. For example, using change-points, a system implemented in accordance with some embodiments of the disclosed subject matter can facilitate tracking of high contrast edges in the scene, and alignment of relatively high speed motion (e.g., due to objects moving in the scene and/or camera movement) across multiple image frames. In a more particular example, a system implemented in accordance with some embodiments of the disclosed subject matter can be used to track global motion (e.g., rotation). In such an example, such a system can track varying motion speeds of different scene pixels, and can combine photons spatially to create deblurred images (e.g., for global motion, such as rotation). As another more particular example, a system implemented in accordance with some embodiments of the disclosed subject matter can be used to track local scene motion. In such an example, such a system can generate robust estimates of flux changepoints around the edges of moving objects that can improve deblurring results obtained from downstream motion alignment and integration.

As described above, mechanisms described herein can be used to identify changepoints based on photon arrivals. The locations of such changepoints can be compared to a spike-train generated by a neuromorphic event camera. For example, unlike a conventional event camera, mechanisms described herein can preserve original intensity information for each pixel. As another example, the number of events, and the location of such events (e.g., changepoints) selected using mechanisms described herein can adapt to each pixel, without using a hard-coded change threshold (e.g., a hard-coded change threshold implemented in some conventional event cameras). As yet another example, direct photon measurements are more sensitive, less noisy, and have a higher time resolution than conventional cameras. As described above, conventional cameras create an analog approximation of a quantized photon stream (e.g., a charge level in a capacitor) and then measure and digitize that analog quantity. This process introduces noise and cannot take advantage of the inherent quantized properties of photons incident on photodetectors. Accordingly, in some embodiments, mechanisms described herein using photon counting techniques can be expected to exhibit higher sensitivity, higher accuracy, and higher temporal resolution (e.g., at least in low light scenarios) than conventional cameras that generate analog values based on photon arrivals integrated over time.

While single-photon image sensing is a rapidly developing field, currently available single-photon sensitive image sensors have limited in spatial resolution compared to conventional complementary metal-oxide-semiconductor (CMOS) and charge-coupled device (CCD) image sensors (e.g., on the order of hundreds to tens of thousands of pixels, compared to millions of pixels). For example, the feasibility of making megapixel resolution single-photon sensitive camera arrays has been the subject of recent research. Additionally, silicon SPAD arrays are amenable to manufacturing at scale using the same photolithographic fabrication techniques used to manufacture conventional CMOS image sensors, such that many of the foundries producing camera sensors used in mobile phones today can likely be configured to manufacture SPAD array sensors at similar cost. Additionally, current SPAD sensors have a relatively small fill factor (e.g., the chip area sensitive to light) resulting from the large amount of additional circuitry that is used in connection with each pixel. Emerging fabrication techniques (e.g., 3D stacking technologies) have the potential to alleviate this limitation by placing the circuitry behind the photosensitive portion of the pixel.

There are currently two main single-photon detection technologies for passive imaging: SPADs and quanta image sensors (QIS). Note that although mechanisms described herein are generally described in connection with SPAD sensors, this is an example, and mechanisms described herein can be used with data generated by other single-photon detection technologies, such as QIS.

FIG. 1 shows an example 100 of a flow for motion adaptive imaging using single-photon image sensor data in accordance with some embodiments of the disclosed subject matter. As shown in FIG. 1, a camera 102 implemented using a SPAD-based array can generate a sequence of frames 106 of a scene 104 at a very high frame rate compared to conventional imaging (e.g., on the order of thousands to hundreds of thousands of frames per second). In FIG. 1, scene 104 can be a scene with relatively low ambient light, and relative motion (e.g., motion of one or more objects in scene 104, motion of camera 102 with respect to scene 104, etc.).

In some embodiments, the SPAD-based array can generate images 106 of the scene that represent arrivals of single photons at various areas (e.g., pixels, groups of pixels, etc.) of the SPAD-based array (sometimes referred to as photon frames). In some embodiments, images 106 can be used to generate one or more images (sometimes referred to herein as changepoint images) that each correspond to a threshold amount of motion (a series of changepoint images is sometimes referred to herein as a video).

In some embodiments, mechanisms described herein can analyze images in a video 108 to identify motion in the scene, and can use the motion in the scene to generate one or more deblurred images of the scene using information from images 106. Additionally or alternatively, mechanisms described herein can output video 108. For example, mechanisms described herein can cause video 108 to be presented using a display. As another example, mechanisms described herein can cause video 108 to be provided to a machine vision process (e.g., a machine vision process implemented using a machine learning model trained using changepoint images). In some embodiments, data that can be used to generate changepoint frames can be referred to as changepoint video data.

SPADs can be used with technologies, such as LiDAR and fluorescence microscopy, in which data is generated in synchronization with a relatively high-power active light source, such as a pulsed laser. In some embodiments, mechanisms described herein can use a SPAD-based array to perform passive imaging (e.g., without a synchronized relatively high-power active light source). For example, mechanisms described herein can collect ambient photons from the scene. As another example, mechanisms described herein can use a relatively low powered light source (e.g., one or more light emitting diodes (LEDs)).

Figure 2:
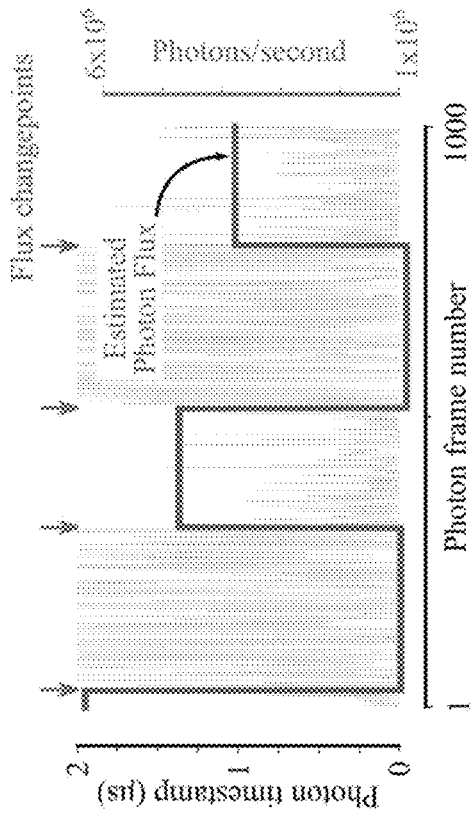
FIG. 2 shows examples of photon frames, flux changepoint estimates based on the photon frames, changepoint frames based on the flux changepoint estimates, and a deblurred image generated based on the photon frames and the changepoint frames in accordance with some embodiments of the disclosed subject matter.
Figure 2:
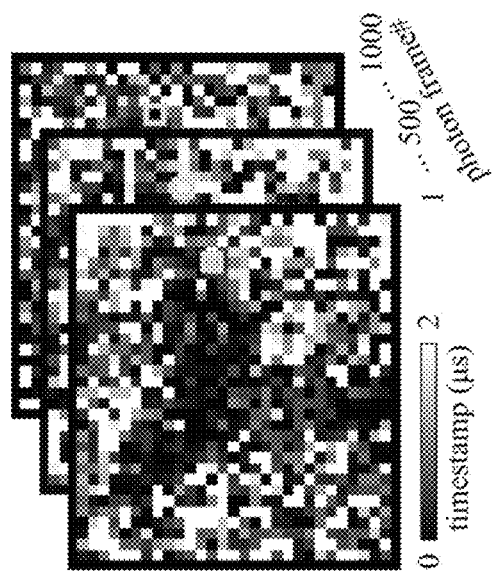
Figure 2:
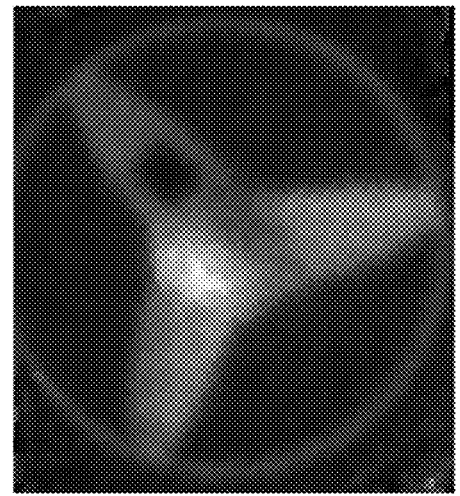
Figure 2:
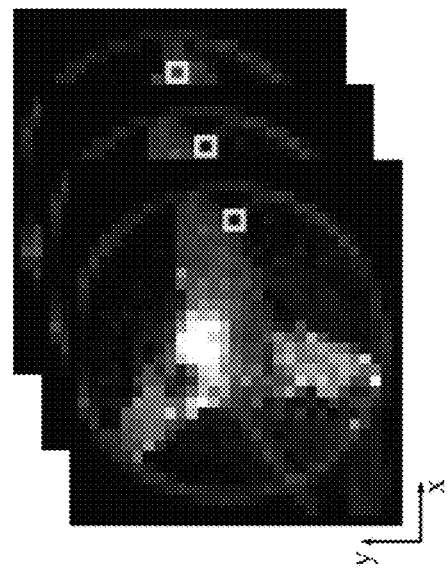

In some embodiments, mechanisms described herein can generate photon frames based on an imaging model that assumes a frame-based readout mechanism in which each SPAD pixel in a photon frame stores at most one timestamp of the first captured ambient photon. Examples are shown in FIGS. 1 and 2 (in FIG. 2, panels (a) and (b)), in which arrival time can represent a time at which a photon arrived (or if the entire frame passed without any photons arriving). In a particular example, a SPAD-based array can be configured to generate a series of arrival times 106*a* corresponding to each area of the array (e.g., each pixel in the array). In the examples shown in FIGS. 1 and 2, a brighter area of the scene can correspond to shorter arrival times, and a dimmer area of the scene can correspond to longer arrival times.

In some embodiments, photon frames can be read out synchronously from the entire SPAD array. For example, data can be read out at relatively high photon frame rates (e.g., on the order of hundreds of kilohertz (kHz) corresponding to frame times on the order of a few microseconds).

In some embodiments, $N_{pf}$ can denote a number of photon frames, and $T_{pf}$ can be a frame period. The total exposure time can be represented by $T=N_{pf}T_{pf}$. Focusing on a specific pixel in the SPAD array, the $i^{th}$ photon frame (e.g., where $1 \leq i \leq N_{pf}$), the output of the pixel can be tagged with a photon arrival timestamp $t_i$ relative to the start of the $i^{th}$ photon frame. In some embodiments, due to random timing jitter and finite resolution of timing electronics, the timestamp can be stored as a discrete fixed-point value. For example, the SPAD-based array used to generate images in FIGS. 10 and 11 has a 250 picosecond discretization. In some embodiments, if no photons are detected during a photon frame, $t_i$ can be set to $T_{pf}$.

In general, photon arrivals at a SPAD pixel can be modeled as a Poisson process. It is possible to estimate the intensity of this process (which can correspond to perceived brightness at the pixel) from the sequence of photon arrival times. A maximum likelihood brightness estimator $\hat{\Phi}$ for the true photon flux $\Phi$ can be represented as:

$$\hat{\Phi} = \frac{\sum_{i=1}^{N_{pf}} 1(t_i \neq T_{pf})}{q \sum_{i=1}^{N_{pf}} t_i}, \quad (1)$$

where q is the sensor's photon detection efficiency, and 1 denotes a binary indicator variable. In EQ. (1), the pixel intensity is assumed to not change during the exposure time T. However, this assumption is violated in when the scene includes motion. If the temporal locations of intensity changes can be located, EQ. (1) can still be used to estimate a time-varying intensity profile for each pixel.

In general, photon flux at a location of a particular portion of an image sensor (e.g., a pixel location, a jot location) may change over time, for example, due to scene motion. Such changes can make it challenging to choose pixel exposure times prior to generating an image. For example, for pixel locations that have with rapidly varying brightness, a shorter exposure time can generate higher quality image data. For pixel locations that have more slowly varying brightness, longer exposure times can be appropriate.

In some embodiments, mechanisms described herein can dynamically adapt to brightness variations and choose time-varying exposure times on a per pixel basis. For example, in some embodiments, mechanisms described herein can locate temporal change locations at which a pixel location's photon flux has a large change. Such a temporal location is sometimes referred to herein as a flux changepoint.

In general, each pixel location in an array (e.g., a SPAD-based array, a QIS array) can have different numbers of flux changepoints, which can occur at different times. In some embodiments, mechanisms described herein can operate based on the assumption that for each pixel the intensity remains constant between consecutive flux changepoints. Some pixel locations can maintain a constant brightness over an entire capture time T (e.g., pixels in a static portion of the scene). For such pixels, mechanisms described herein can determine that no flux changepoints are detected, and photons can be integrated over the entire capture time T to estimate a brightness of that portion of the scene. For pixels with brightness changes (e.g., due to motion), mechanisms described herein can approximate intensity variations using any suitable technique or combination of techniques. For example, mechanisms described herein can estimate intensity over each piecewise constant sub-interval by summing photons during that sub-interval (e.g., an interval between two flux changepoints). As described below, the lengths of such sub-intervals can depend on how quickly the local pixel brightness varies over time, which in turn, can depend on the true motion speed. In some embodiments, mechanisms described herein can be unaffected by brightness changes in the scene due to lighting conditions (e.g., non-uniform scene illumination, shadows, etc.) when the change(s) in lighting occurs more slowly than motion of objects in the scene (e.g., natural light). Lighting changes that are relatively abrupt (e.g., a high speed flash, lightning, etc.), may cause a changepoint to be detected for one or more scene areas.

In some embodiments, mechanisms described herein can use any suitable technique to detect changepoints for each of various regions of an image (e.g., for each pixel, for a group of pixels, etc.). For example, mechanisms described herein can use any technique that can split a time-series of measurements into regions with similar statistical properties. In particular, a time series generated by a SPAD-based array can be a sequence of photon timestamps at a pixel location, and mechanisms described herein can attempt to identify regions where the timestamps have the same mean arrival rate (e.g., the photon flux during this time is roughly constant). Such regions with relatively constant flux can be referred to as virtual exposures. In some embodiments, mechanisms described herein can generate a set of estimated flux values 108*a* associated with a particular pixel based on the regions of relatively constant flux identified. Photons in each virtual exposure can be aggregated to create a piecewise constant flux estimates, which can be used to generate changepoint images and/or a video including changepoint images.

The changepoint data (and the video of changepoint frames) does not have an inherent frame rate, as each pixel can be associated with a continuous time piecewise constant function, which can facilitate sampling of the changepoint video data at arbitrarily spaced time instants in [0,T] to obtain any suitable frame rate. For example, mechanisms described herein can sample the changepoint video data at non-uniform time intervals using any suitable criterion or combination of criterion. In a more particular example, starting with the initial frame sampled at t=0, mechanisms described herein can sample (e.g., generate) subsequent frames at moments in time when at least a threshold portion (e.g., 1%, 5%, 10%, 15%, 20%, 25%, etc.) of the pixel values have switched to a new estimated photon flux. This can generate a series of frames with a variable frame rate that adapts to changes in scene dynamics (e.g., changes in velocity of motion in the scene), such that scenes with fast moving objects can be expected to produce a higher average video frame rate. Note that although mechanisms described herein are generally described as using photon frames in which each pixel location is associated with the arrival of one or more single photons during a frame period, mechanisms described herein can be used with conventional cameras (e.g., cameras with a frame rate above 30 frames per second).

In some embodiments, generating a series of changepoint frames (e.g., a video) using a threshold to adaptively generate changepoint images can preserve relatively large brightness changes in a scene. For example, the edges of a bright object moving across a dark background remain relatively sharp in each changepoint image. Note that portions of the scene with finer texture details (e.g., within the borders of an object) may appear blurred.

In some embodiments, mechanisms described herein can identify changepoints using a non-causal technique (which can be referred to as an offline technique). Such a non-causal changepoint identification technique can use a full sequence of photon timestamps associated with a particular pixel to estimate flux changepoints at that pixel. Additionally or alternatively, in some embodiments, mechanisms described herein can identify whether a particular photon frame corresponds to a changepoint using a technique that uses photon timestamps from preceding photon frames in a sequence of photon timestamps, and using fewer or zero photon timestamps from frames that come after the particular photon frames.

In some embodiments, mechanisms described herein can use a changepoint identification technique based on an optimization problem that can be represented as:

$$(l_i^*)_{i=1}^L = \arg\min_{l_1,\ldots,l_L}\left[-\log(\hat{\Phi}_i)\sum_{j=l_i}^{l_{i+1}} 1(t_j \neq T_{pf})\right] + \lambda L, \quad (2)$$

where $\hat{\Phi}_i$ is the photon flux estimate given by EQ. (1) using only the subset of photons between times $t_{l_i}$ and $t_{l_{i+1}}$. Here $\lambda$ is a penalty term that can mitigate overfitting by penalizing the number of flux changepoints. Various techniques can be used to detect changepoints. For example, mechanisms described herein can be implemented using the BOTTO-MUP algorithm made available by C. Truong, in the ruptures Python Package (available at https://ctruong(dot)perso(dot)math(dot)cnrs(dot)fr/ruptures-docs/build/html/index(dot)html) which is approximate but has a relatively fast run time (e.g., suitable for relatively large images). For example, mechanisms described herein can be implemented using the Pruned Exact Linear Time (PELT) algorithm described in Killick et al., "Optimal detection of changepoints with a linear computational cost," Journal of the American Statistical Association, 107(500):1590-1598 (2012), which gives an exact solution but runs slower (e.g., suitable for relatively small images). Additional details related to changepoint detection are described in Appendix A, which is hereby incorporated by reference herein in its entirety.

Note that the cost function represented in EQ. (2) applies to photon timestamp data, but the same concept of adaptive flux changepoint detection can be used with photon count data as well (e.g., generated using a QIS sensor or a SPAD-based sensor). A modified cost function that uses photon counts (0 or 1) is described in Appendix A, which has been incorporated herein by reference.

In general, as the number of pixels increases, processing photon frames with high spatio-temporal resolution can be expected to be increasingly resource intensive if the techniques used for processing are not altered. The online changepoint technique described in Appendix A can reduce resource use, and accordingly, may be more suitable for a real-time implementation. Additionally, changepoint data can be used to implement video compression with variable frame rate. For example, by tuning the regularization parameter of the changepoint detection algorithm used a tradeoff between image fidelity and data rate can be achieved.

In some embodiments, mechanisms described herein can use changepoint data to estimate motion information in the scene. Such motion information can be used in connection with the photon frames to create a deblurred image or images (e.g., a deblurred video).

In some embodiments, at 110, any suitable technique can be used to estimate motion using changepoint data. For example, mechanisms described herein can use a correlation-based image registration technique to estimate motion between consecutive frames in changepoint data. In a more particular example, for each location p=[x,y] in an $i^{th}$ changepoint video frame, it can be assumed to map to a location p' in the $(i+1)^{st}$ frame. In such an example, the mapping can be approximated using a linear transformation:

$$Ap=p', \quad (3)$$

In some embodiments, A can be constrained to represent planar Euclidean motion (rotation and translation). For example, using $\theta$ to represent the amount of rotation centered around a point $[r_x,r_y]$, and $[\tau_x,\tau_y]$ to represent a translation vector, A can be represented as:

$$A = \begin{Bmatrix} \cos\theta & \sin\theta & r_x(1-\cos\theta)+r_y\sin\theta+\tau_x \\ -\sin\theta & \cos\theta & r_y(1-\cos\theta)-r_x\sin\theta+\tau_y \\ 0 & 0 & 1 \end{Bmatrix}, \quad (4)$$

In some embodiments, an enhanced correlation coefficient maximization algorithm can be used to estimate transformation matrix A for consecutive pairs of changepoint frames i→i+1 (e.g., the enhanced correlation coefficient maximization algorithm described in Evangelidis et al., "Parametric Image Alignment using Enhanced Correlation Coefficient Maximization," IEEE Transactions on Pattern Analysis and Machine Intelligence (2008)). Arbitrarily shaped global motion trajectories can be generated based on a sequence of frame-to-frame linear transformations determined using techniques described herein. In some embodiments, mechanisms described herein can use a patch-wise alignment and merging technique(s) to estimate more complex local motion and occlusions (e.g., as described in Hasinoff et al., "Burst photography for high dynamic range and low-light imaging on mobile cameras," ACM Transactions on Graphics (TOG) (2016), and/or Ma et al., "Quanta burst photography," *ACM Trans. Graph.* (2020)).

In some embodiments, at 112, mechanisms described herein can sum photon counts along estimated spatio-temporal motion trajectories for each pixel using photon counts from the original photon frames, which can be used to generate a series of one or more still images 114 can be generated from the original photon frames. In some embodiments, the photon counts and the total time associated with the summed frames can be used to estimate the brightness associated with a pixel using any suitable technique or combination of techniques. For example, techniques described in connection with EQS. (S8) and (S9) of Appendix A.

In some embodiments, mechanisms described herein can assume that rotation, $[r_x, r_y]$, is centered around the middle of the image and a change in rotation center can be modeled as a translation. For example, mechanisms described herein can solve for $\theta$, $\tau_x$, and $\tau_y$, which can be linearly interpolated. Then using the interpolated motion parameters and EQ. (3), mechanisms described herein can align all photon frames corresponding to the time interval between changepoint frames i→i+1, and can sum these frames to get a photon flux image using EQ. (1) at each pixel. This can generate a motion deblurred video with the same frame rate as the series of changepoint frames, but with finer textures preserved as shown in images 114.

In some embodiments, any suitable technique can be used to generate a deblurred image 116 from images 114. For example, if a single deblurred image is to be generated (e.g., saved to memory, transmitted to another device, presented using a display, etc.), mechanisms described herein can repeat the process described above on consecutive frames in images 114, each time decreasing the frame rate by a factor of 2, until eventually a single image is generated. This can facilitate progressively combining photons along spatial-temporal motion trajectories to increase the overall signal to noise ratio (SNR), and can also preserve high frequency details that may have been lost in changepoint images 108. In some embodiments, each image 114 can be associated with a current count sum (e.g., a count of photon frames in which a photon was detected) and a current time sum (e.g., a sum of time values associated with the detections). When combining information from two images 114, mechanisms described herein can use motion information (e.g., determined using video 108) to align the images, and can add the count sums and time sums associated with pixels along each motion trajectory, and can use the added count sums and time sums to estimate brightness (e.g., using EQ. (1)) for each pixel of the new image. Alternatively, in some embodiments, mechanisms described herein can use the estimated brightness associated with each pixel along a trajectory to estimate a brightness of pixels in the new image.

Note that while techniques described herein for aligning and adding photon frames has some similarities to a contrast maximization algorithm used for event cameras, such techniques do not preserve intensity data unlike event camera data. As described above, in some embodiments, techniques described herein can utilize a video and/or other data that includes information on intensity and intensity changepoints (e.g., derived from single-photon timestamps, derived from photon counts, etc.). Additionally, deblurring techniques used in connection with event camera data can be adapted to photon frame data (e.g., generate by a SPAD-based sensor, generated by a QIS, etc.), as the flux change-points can represent changes in brightness similar to out-put of event cameras (e.g., techniques described in Gallego et al., "Event-based vision: A survey," IEEE Transactions on Pattern Analysis and Machine Intelligence (2020); Gehrig et al., "EKLT: Asynchronous, photometric feature tracking using events and frames," Int. J. Comput. Vis. (2019); and Stoffregen et al., "Event-based motion segmentation by motion compensation," Proceedings of the IEEE International Conference on Computer Vision, (2019)).

In general, motion caused by camera shake can generally be expected to be caused by from small rotations in the camera that result in 2D translations and rotations in the image frames. The short distance translations of shaking camera can cause translations in the frames that are similar in nature, but smaller in magnitude to translations caused by object motion.

Translation of the camera over larger distances can result in parallax while motion within the scene can result in more complex changes. In these cases, technique described herein can capture scene changes approximately. For example, mechanisms described herein can be used to estimate frame to frame motion over short time-scales and limited to regions in the scene. Accordingly, deblurred images generated from data with large camera translations and/or large motions within the scene can include blurring and/or other artifacts. However, the photon frame image data and changepoint frames can be expected to be relatively free from blur and/or other artifacts.

FIG. 2 shows examples of photon frames, flux changepoint estimates based on the photon frames, changepoint frames based on the flux changepoint estimates, and a deblurred image generated based on the photon frames and the changepoint frames in accordance with some embodiments of the disclosed subject matter. As shown in FIG. 2, panel (a), mechanisms described herein can utilize a series of photon frames in which each pixel is associated with a timestamp indicating when a photon was detected within an exposure associated with that frame. As described above, in some embodiments, when a photon is not detected within a frame, a particular time (e.g., 2 μs) can be assigned to the pixel for that frame.

In FIG. 2, panel (b), a time series of photon timestamps for a particular pixel is shown with flux changepoints highlighted with arrows, and estimated photon flux (in photons/second). As shown in FIG. 2, panel (b), longer photon timestamps generally correspond to lower photon flux, and shorter photon timestamps generally correspond to higher photon flux (e.g., as a photon is more likely to arrive early in a frame when the portion of the scene associated with the pixel is associated with high flux). In FIG. 2, panel (b), it can be seen that the photon timestamps rapidly vary and are extremely noisy due to a heavy-tailed exponential distribution. The changepoints (highlighted with arrows), can be calculated using techniques described herein. For example, in some embodiments, using the sequence of photon arrival times associated with the pixel, $\{t_i\}_{i=1}^{N_{pf}}$, mechanisms described herein can attempt to identify a subset $[t_{l_1}, \ldots, t_{l_L}]$, representing the flux changepoints. It can be assumed that photon flux between consecutive flux changepoints remains constant. For convenience, additionally, the first and the last flux changepoint can be defined to be the first and the last photons captured by the pixel $l_1=1$ and $l_L=N_{pf}$).

Additionally, mechanisms described herein can estimate a piecewise constant flux waveform for the pixel (shown by the solid line) using the timestamps between changepoints. In the example shown in FIG. 2, panel (b), five different flux levels are detected.

In FIG. 2, panel (c), an example of a portion of a series of changepoint frames generated based on the data represented in panels (a) and (b) is shown. FIG. 2, panel (d), shows an example of a deblurred image generated using motion trajectories determined using the changepoint frames of panel (c) and the photon frame data shown in panel (a) (e.g., as described above in connection with deblurred image 116).

Figure 3:
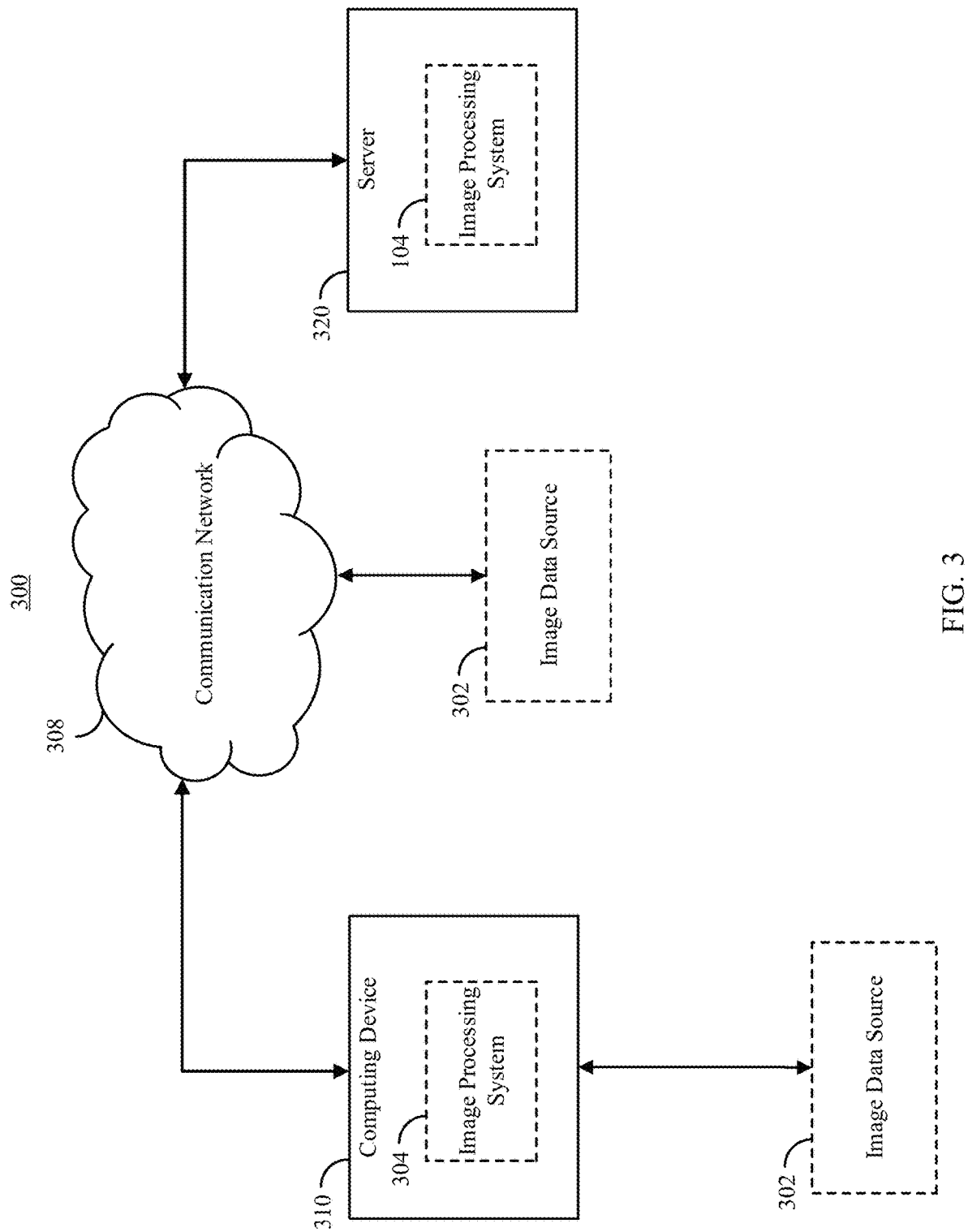
FIG. 3 shows an example of a system for adaptive imaging using single-photon image sensor data in accordance with some embodiments of the disclosed subject matter.

FIG. 3 shows an example 300 of a system for adaptive imaging using single-photon image sensor data in accordance with some embodiments of the disclosed subject matter. As shown in FIG. 3, a computing device 310 can receive image data from an image data source 302. In some embodiments, computing device 310 can execute at least a portion of an image processing system 304 to perform an image processing task, such as generating a deblurred image, generating a series of deblurred images (e.g., a deblurred video), generating a series of changepoint frames, etc. Additionally, in some embodiments, computing device 310 can execute at least a portion of a machine vision system (not shown) to perform a machine vision task, such as image classification, object detection, image segmentation, object tracking, and/or any other suitable computer vision task. For example, a machine vision system can receive one or more images (e.g., a deblurred image, a deblurred video, a video of changepoint frames, etc.) generated by image processing system 304, and can perform a machine vision tasks based on the image(s) received from image processing system 304.

Additionally or alternatively, in some embodiments, computing device 310 can communicate data received from image data source 302 to a server 320 over a communication network 308, which can execute at least a portion of image processing system 304 and/or at least a portion of a machine vision system. In such embodiments, server 320 can return information to computing device 310 (and/or any other suitable computing device) indicative of an output of an image processing task performed by image processing system 304 and/or a computer vision system. In some embodiments, image processing system 304 can execute one or more portions of process 700 described below in connection with FIG. 7.

In some embodiments, computing device 310 and/or server 320 can be any suitable computing device or combination of devices, such as a desktop computer, a laptop computer, a smartphone, a tablet computer, a wearable computer, a server computer, a computing device integrated into a vehicle (e.g., an autonomous vehicle), a camera, a robot, a virtual machine being executed by a physical computing device, etc.

In some embodiments, image data source 302 can be any suitable source of image data (e.g., implemented with a SPAD-based array, implemented with a QIS, etc.) and/or other data that can be used to generate changepoint data (e.g., a series of changepoint frames, lists of changepoints and associated flux estimates) as described herein (e.g., depicting a scene in a physical environment of image data source 302). For example, image data source 302 can be implemented using one or more digital cameras that generate and/or output image data indicative of an arrival time of single photons. In a more particular example, image data source 302 can include an imaging device configured to detect arrival of individual photons (e.g., using avalanche photodiodes), such as imaging devices described in U.S. patent application Ser. No. 16/844,899, filed Apr. 9, 2020, and titled "Systems, methods, and media for high dynamic range quanta burst imaging." As another more particular example, image data source 302 can include an imaging device configured to detect arrival of individual photons (e.g., using jot-based detectors), such as imaging devices described in Fossum et al., "The quanta image sensor: Every photon Counts," Sensors, (2016).

In some embodiments, image data source 302 can be local to computing device 310. For example, image data source 302 can be incorporated with computing device 310 (e.g., computing device 310 can be configured as part of a device for capturing, storing, and/or processing image data). As another example, image data source 302 can be connected to computing device 310 by a cable, a direct wireless link, etc. Additionally or alternatively, in some embodiments, image data source 302 can be located locally and/or remotely from computing device 310, and can communicate image data (e.g., photon frames, changepoint image data, a series of changepoint frames, changepoint video data etc.) to computing device 310 (and/or server 320) via a communication network (e.g., communication network 308).

In some embodiments, communication network 308 can be any suitable communication network or combination of communication networks. For example, communication network 308 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard, such as CDMA, GSM, LTE, LTE Advanced, NR, etc.), a wired network, etc. In some embodiments, communication network 308 can be a local area network, a wide area network, a public network (e.g., the Internet), a private or semi-private network (e.g., a corporate or university intranet), any other suitable type of network, or any suitable combination of networks. Communications links shown in FIG. 3 can each be any suitable communications link or combination of communications links, such as wired links, fiber optic links, Wi-Fi links, Bluetooth links, cellular links, etc.

Figure 4:
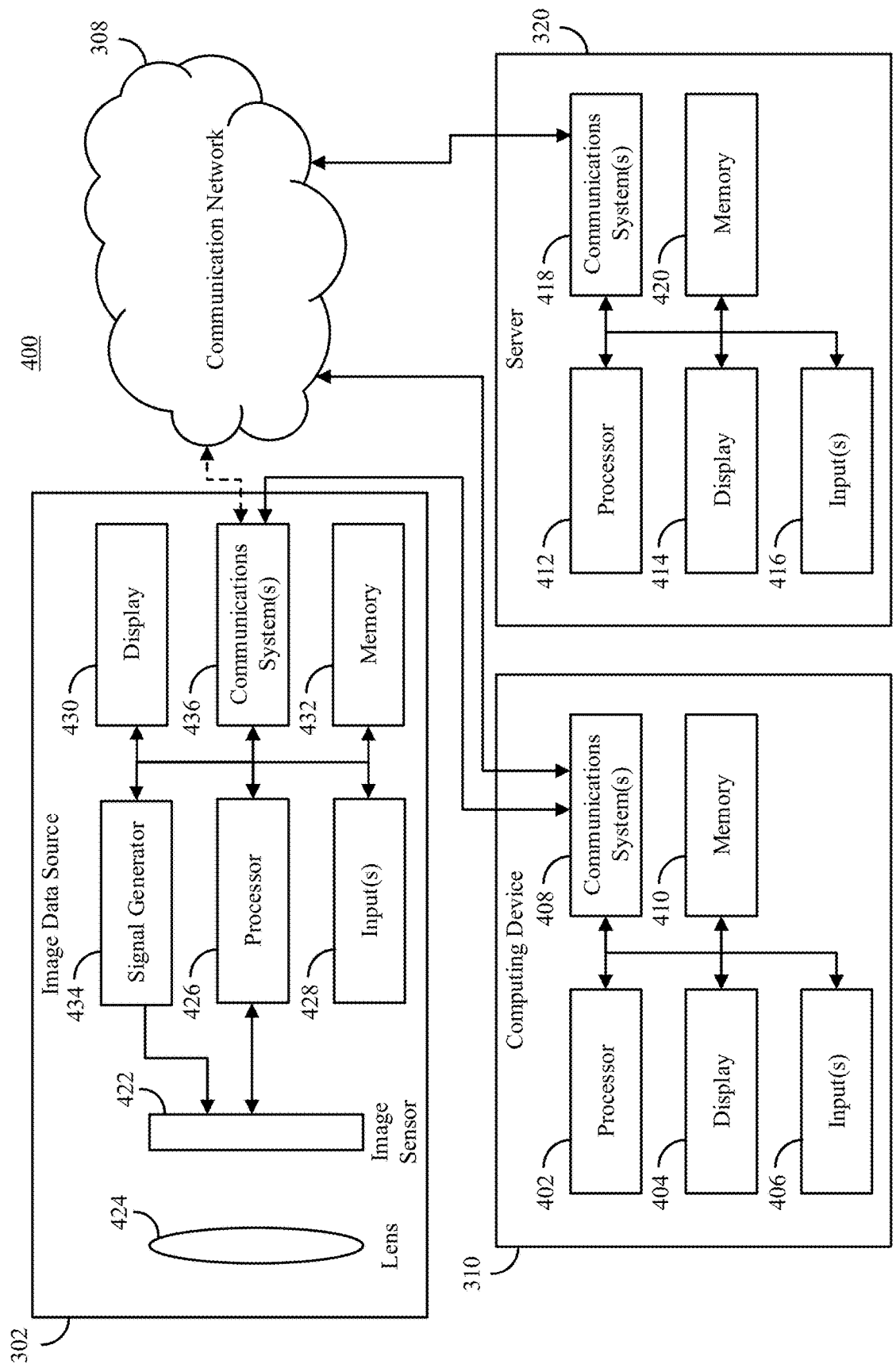
FIG. 4 shows an example of hardware that can be used to implement an image data source, a computing device, and a server, shown in FIG. 3 in accordance with some embodiments of the disclosed subject matter.

FIG. 4 shows an example of hardware that can be used to implement image data source 302, computing device 310, and/or server 320, shown in FIG. 3 in accordance with some embodiments of the disclosed subject matter. As shown in FIG. 4, in some embodiments, computing device 310 can include a processor 402, a display 404, one or more inputs 406, one or more communication systems 408, and/or memory 410. In some embodiments, processor 402 can be any suitable hardware processor or combination of processors, such as a central processing unit (CPU), a graphics processing unit (GPU), an application specific integrated circuit (ASIC), a field-programmable gate array (FPGA), etc. In some embodiments, display 404 can include any suitable display devices, such as a computer monitor, a touchscreen, a television, an infotainment screen, etc. In some embodiments, inputs 406 can include any suitable input devices and/or sensors that can be used to receive user input, such as a keyboard, a mouse, a touchscreen, a microphone, etc.

In some embodiments, communications systems 408 can include any suitable hardware, firmware, and/or software for communicating information over communication network 308 and/or any other suitable communication networks. For example, communications systems 408 can include one or more transceivers, one or more communication chips and/or chip sets, etc. In a more particular example, communications systems 408 can include hardware, firmware and/or software that can be used to establish a Wi-Fi connection, a Bluetooth connection, a cellular connection, an Ethernet connection, etc.

In some embodiments, memory 410 can include any suitable storage device or devices that can be used to store image data, instructions, values, etc., that can be used, for example, by processor 402 to perform an image processing task, to present content using display 404, to communicate with server 320 via communications system(s) 308, etc. Memory 410 can include any suitable volatile memory, non-volatile memory, storage, or any suitable combination thereof. For example, memory 410 can include random access memory (RAM), read-only memory (ROM), electronically-erasable programmable read-only memory (EEPROM), one or more flash drives, one or more hard disks, one or more solid state drives, one or more optical drives, etc. In some embodiments, memory 410 can have encoded thereon a computer program for controlling operation of computing device 310. For example, in such embodiments, processor 402 can execute at least a portion of the computer program to perform one or more image processing tasks described herein and/or to perform one or more machine vision tasks based on an output generate by an image processing task described herein, present content (e.g., images, information about an object included in image data, information about distances to one or more points in a scene, etc.), receive information and/or content from image data source 302, transmit information to image data source 302, receive information and/or content from server 320, transmit information to server 320, etc. As another example, processor 402 can execute at least a portion of the computer program to implement image processing system 304 and/or a machine vision system. As yet another example, processor 402 can execute at least a portion of process 700 described below in connection with FIG. 7.

In some embodiments, server 320 can include a processor 412, a display 214, one or more inputs 416, one or more communications systems 418, and/or memory 420. In some embodiments, processor 412 can be any suitable hardware processor or combination of processors, such as a CPU, a GPU, an ASIC, an FPGA, etc. In some embodiments, display 414 can include any suitable display devices, such as a computer monitor, a touchscreen, a television, etc. In some embodiments, inputs 416 can include any suitable input devices and/or sensors that can be used to receive user input, such as a keyboard, a mouse, a touchscreen, a microphone, etc.

In some embodiments, communications systems 418 can include any suitable hardware, firmware, and/or software for communicating information over communication network 308 and/or any other suitable communication networks. For example, communications systems 418 can include one or more transceivers, one or more communication chips and/or chip sets, etc. In a more particular example, communications systems 418 can include hardware, firmware and/or software that can be used to establish a Wi-Fi connection, a Bluetooth connection, a cellular connection, an Ethernet connection, etc.

In some embodiments, memory 420 can include any suitable storage device or devices that can be used to store instructions, values, etc., that can be used, for example, by processor 412 to present content using display 414, to communicate with one or more computing devices 310, to communicate with one or more image data sources 302, etc. Memory 420 can include any suitable volatile memory, non-volatile memory, storage, or any suitable combination thereof. For example, memory 420 can include RAM, ROM, EEPROM, one or more flash drives, one or more hard disks, one or more solid state drives, one or more optical drives, etc. In some embodiments, memory 420 can have encoded thereon a server program for controlling operation of server 320. For example, in such embodiments, processor 412 can execute at least a portion of the server program to perform one or more image processing tasks described herein and/or to perform one or more machine vision tasks based on an output generate by an image processing task described herein, present content (e.g., images, information about an object included in image data, information about distances to one or more points in a scene, etc.), receive information and/or content from image data source 302, transmit information to image data source 302, receive information and/or content from computing device 310, transmit information to computing device 310, etc. As another example, processor 412 can execute at least a portion of the server program to implement image processing system 304 and/or a machine vision system. As yet another example, processor 412 can execute at least a portion of process 700 described below in connection with FIG. 7.

In some embodiments, image data source 302 can include a processor 422, one or more sensors 424, one or more communications systems 426, and/or memory 428. In some embodiments, processor 422 can be any suitable hardware processor or combination of processors, such as a CPU, a GPU, an ASIC, an FPGA, etc. In some embodiments, sensor(s) 424 can be any suitable components to generate image data (e.g., asynchronously) representing a portion of a scene. For example, sensor(s) 224 can include a CMOS sensor, a CCD sensor, an array of single-photon avalanche diodes (SPADs), an array of jots (e.g., as described in U.S. patent application Ser. No. 16/844,899), a LiDAR sensor, etc. Although not shown, image data source 102 can include one or more light sources (e.g., a LiDAR light source, a light source for structured light imaging, a modulated light source for continuous time-of-flight imaging, etc.).

Note that, although not shown, image data source 102 can include any suitable inputs and/or outputs. For example, image data source 102 can include input devices and/or sensors that can be used to receive user input, such as a keyboard, a mouse, a touchscreen, a microphone, a trackpad, a trackball, hardware buttons, software buttons, etc. As another example, image data source 102 can include any suitable display devices, such as a computer monitor, a touchscreen, a television, etc., one or more speakers, etc.

In some embodiments, communications systems 226 can include any suitable hardware, firmware, and/or software for communicating information to computing device 110 (and, in some embodiments, over communication network 108 and/or any other suitable communication networks). For example, communications systems 226 can include one or more transceivers, one or more communication chips and/or chip sets, etc. In a more particular example, communications systems 226 can include hardware, firmware and/or software that can be used to establish a wired connection using any suitable port and/or communication standard (e.g., VGA, DVI video, USB, RS-232, etc.), Wi-Fi connection, a Bluetooth connection, a cellular connection, an Ethernet connection, etc.

In some embodiments, memory 228 can include any suitable storage device or devices that can be used to store instructions, values, image data, etc., that can be used, for example, by processor 222 to: control sensor(s) 224, and/or receive outputs from sensor(s) 224; generate image data; present content (e.g., images, a user interface, etc.) using a display; communicate with one or more computing devices 110; etc. Memory 228 can include any suitable volatile memory, non-volatile memory, storage, or any suitable combination thereof. For example, memory 228 can include RAM, ROM, EEPROM, one or more flash drives, one or more hard disks, one or more solid state drives, one or more optical drives, etc. In some embodiments, memory 228 can have encoded thereon a program for controlling operation of image data source 102. For example, in such embodiments, processor 222 can execute at least a portion of the program to generate image data, transmit information and/or content (e.g., image data) to one or more computing devices 110, receive information and/or content from one or more computing devices 110, transmit information and/or content (e.g., image data) to one or more servers 120, receive information and/or content from one or more servers 120, receive instructions from one or more devices (e.g., a personal computer, a laptop computer, a tablet computer, a smartphone, etc.), etc. As another example, processor 222 can execute at least a portion of the program to implement computer vision system 104. As yet another example, processor 222 can execute at least a portion of process 600 described below in connection with FIG. 6.

As shown, system 300 can include an image sensor 422 (e.g., an area sensor that includes an array of single photon detectors); optics 424 (which can include, for example, one or more lenses, one or more attenuation elements such as a filter, a diaphragm, and/or any other suitable optical elements such as a beam splitter, etc.); a processor 426 for controlling operations of image data source 302 which can include any suitable hardware processor (which can be a central processing unit (CPU), a digital signal processor (DSP), a microcontroller (MCU), a graphics processing unit (GPU), etc.) or combination of hardware processors; an input device(s) 428 (such as a shutter button, a menu button, a microphone, a touchscreen, a motion sensor, etc., or any suitable combination thereof) for accepting input from a user and/or from the environment; a display 430 (e.g., a touchscreen, a liquid crystal display, a light emitting diode display, etc.) to present information (e.g., images, user interfaces, etc.) for consumption by a user; memory 432; a signal generator 434 for generating one or more signals to control operation of image sensor 422; a communication system or systems 436 for facilitating communication between image data source 302 and other devices, such as a smartphone, a wearable computer, a tablet computer, a laptop computer, a personal computer, a server, an embedded computer (e.g., for controlling an autonomous vehicle, robot, etc.), etc., via a communication link. In some embodiments, memory 432 can store image data, and/or any other suitable data. Memory 432 can include a storage device (e.g., RAM, ROM, EEPROM, one or more flash drives, one or more hard disks, one or more solid state drives, one or more optical drives, etc.) for storing a computer program for controlling processor 426. In some embodiments, memory 432 can include instructions for causing processor 426 to execute processes associated with the mechanisms described herein, such as process 700 described below in connection with FIG. 7.

In some embodiments, image sensor 422 can be an image sensor that is implemented at least in part using an array of SPAD detectors (sometimes referred to as a Geiger-mode avalanche diode) and/or one or more other detectors that are configured to detect the arrival time of individual photons (e.g., jots of a QIS). In some embodiments, one or more elements of image sensor 422 can be configured to generate data indicative of the arrival time of photons from the scene via optics 424. For example, in some embodiments, image sensor 422 can be an array of multiple SPAD detectors. As yet another example, image sensor 422 can be a hybrid array including SPAD detectors and one or more conventional light detectors (e.g., CMOS-based pixels). As still another example, image sensor 422 can be multiple image sensors, such as a first image sensor that includes an array of SPAD detectors that can be used to generate information about the brightness of the scene and a second image sensor that includes one or more conventional pixels that can be used to generate information about the colors in the scene. In such an example, optics 306 can include one or more optical elements (e.g., multiple lenses, a beam splitter, etc.) configured to direct a portion of incoming light toward a SPAD-based image sensor and another portion toward a conventional image sensor.

In some embodiments, image data source 302 can include additional optics. For example, although optics 424 is shown as a single lens, it can be implemented as a compound lens or combination of lenses. Note that although mechanisms described herein are generally described as using SPAD-based detectors, this is merely an example of a single photon detector. As described above, other single photon detectors can be used, such as jot-based image sensors.

In some embodiments, signal generator 434 can be one or more signal generators that can generate signals to control image sensor 422. For example, in some embodiments, signal generator 434 can supply signals to enable and/or disable one or more pixels of image sensor 422 (e.g., by controlling a gating signal of a SPAD used to implement the pixel). As another example, signal generator 434 can supply signals to control readout of image signals from image sensor 422 (e.g., to memory 432, to processor 426, to a cache memory associated with image sensor 422, etc.).

In some embodiments, image data source 302 can communicate with a remote device over a network using communication system(s) 436 and a communication link. Additionally or alternatively, image data source 302 can be incorporated as part of another device and/or integrated as part of another device (e.g., computing device 310), such as a smartphone, a tablet computer, a laptop computer, an autonomous vehicle, a robot, etc. Parts of image data source 302 can be shared with a device within which image data source 302 is integrated. For example, if image data source 302 is integrated with an autonomous vehicle, processor 426 can be a processor of the autonomous vehicle and can be used to control operation of image data source 302.

In some embodiments, display 430 can be used to present images and/or video generated by image data source 302 and/or by another device (e.g., computing device 310, server 320, etc.), to present a user interface, etc. In some embodiments, display 430 can be implemented using any suitable device or combination of devices, and can include one or more inputs, such as a touchscreen.

Figure 5:
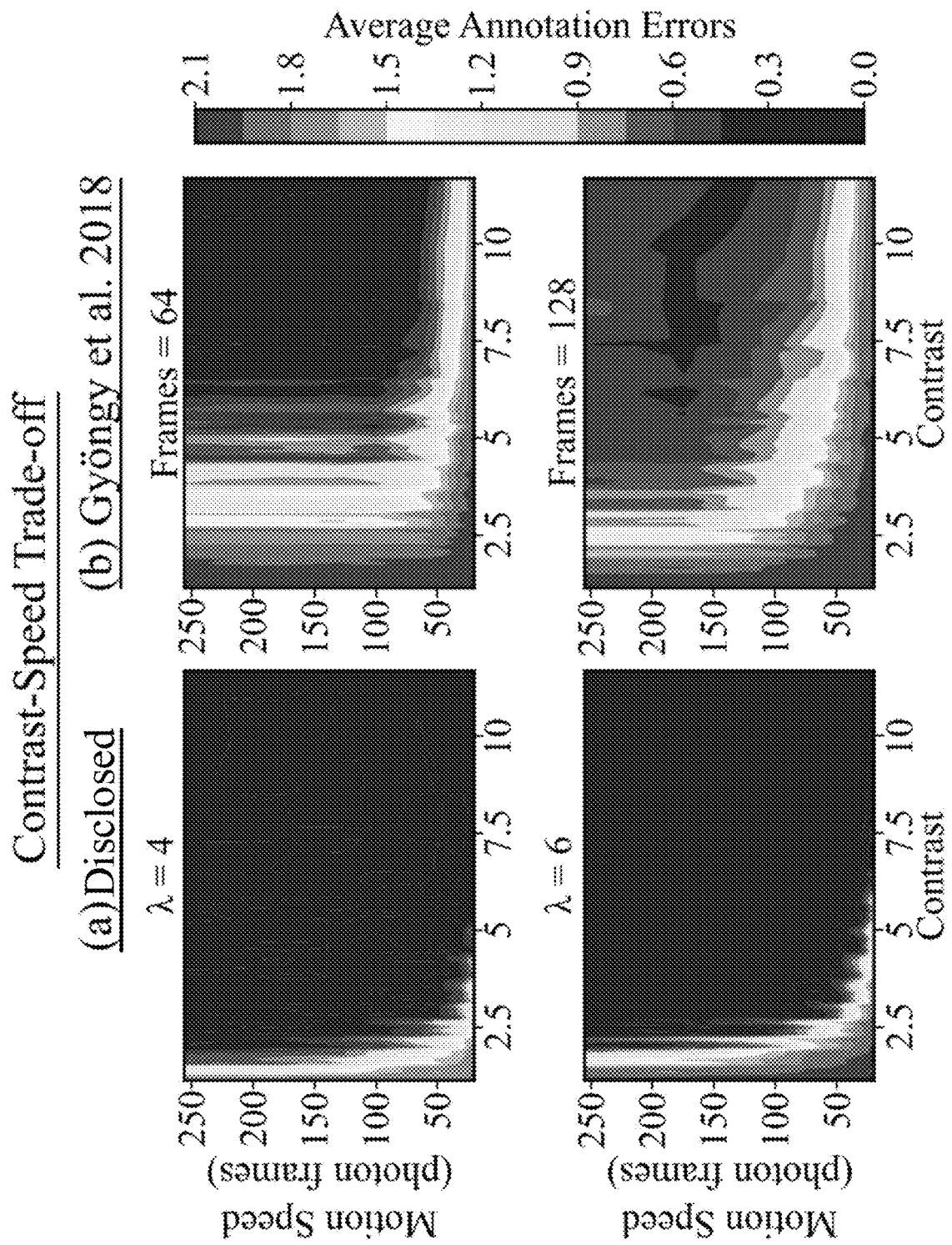
FIG. 5 shows an example illustrating a comparison of errors generated at different combinations of scene motion and scene contrast by a simulated implementation of mechanisms described herein and another technique.

FIG. 5 shows an example illustrating a comparison of errors generated at different combinations of scene motion and scene contrast by a simulated implementation of mechanisms described herein and another technique. As shown in FIG. 5, there is generally a trade-off between contrast and motion speed when attempting to detect changepoints. For example, it is generally more difficult to detect flux changes as an object moves more quickly and/or as contrast between the object and its background decreases. To evaluate this trade-off, a single SPAD pixel was simulated for 800 photon frames with a time varying flux signal with a randomly placed pulse wave. The pulse width can be used as a proxy for motion speed, and contrast can be varied by varying the ratio of the pulse height. The absolute difference was calculated between the number of changepoints detected using mechanisms described herein and the true number of flux changes (which is exactly 2 for a single pulse), which is referred to herein as annotation error.

FIG. 5 compares annotation errors generated from the simulated data with different values of contrast and motion speeds for two different techniques. For each set of contrasts and motion speeds 120 simulations were run, and FIG. 5 shows the average number of annotation errors. FIG. 5, column (a) shows results generated using mechanisms described herein utilizing the PELT algorithm described above in connection with FIG. 1 and EQ. (2) with two different values for penalty term λ. FIG. 5, column (b) shows results generated using a fixed windowing approach discussed in Gyöngy et al., "Single-photon tacking for high-speed vision," Sensors (2018) with two different window sizes (i.e., 64 frames and 128 frames). As shown in FIG. 5, mechanisms described herein generally produced fewer annotation errors at most combinations of motion and contrast, especially notable in challenging conditions such as high speed and low contrast.

Figure 6:
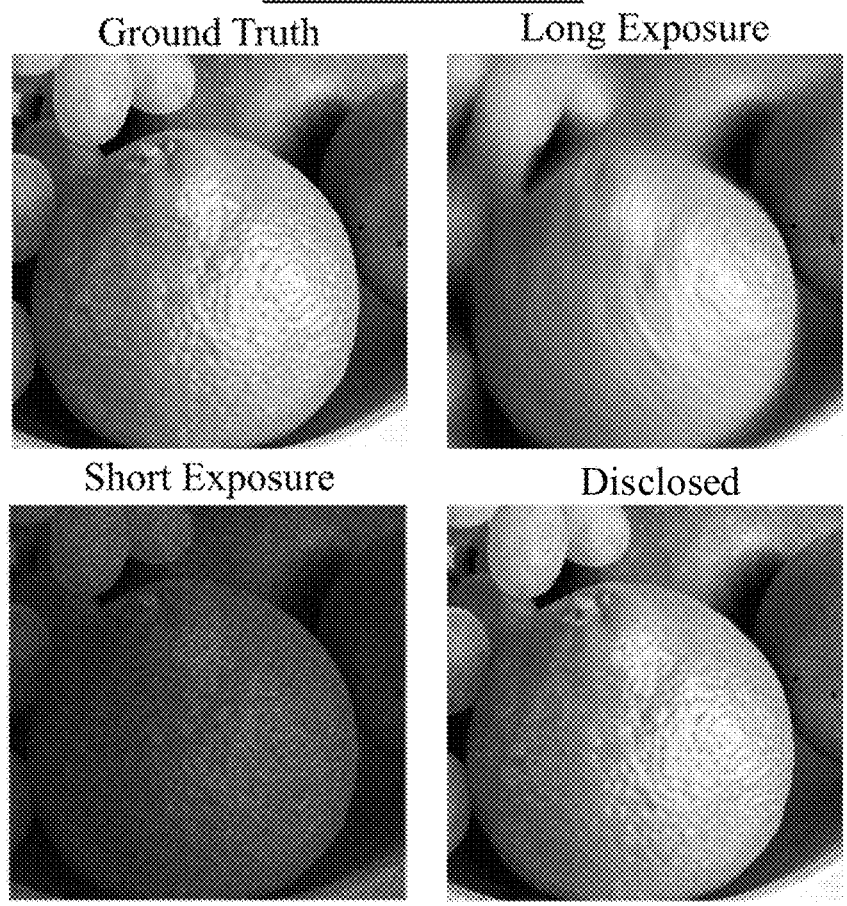
FIG. 6 shows an example of a scene, images of the scene generated using various techniques including techniques described herein, and signal to noise ratio of various techniques at different levels of scene brightness.
Figure 6:
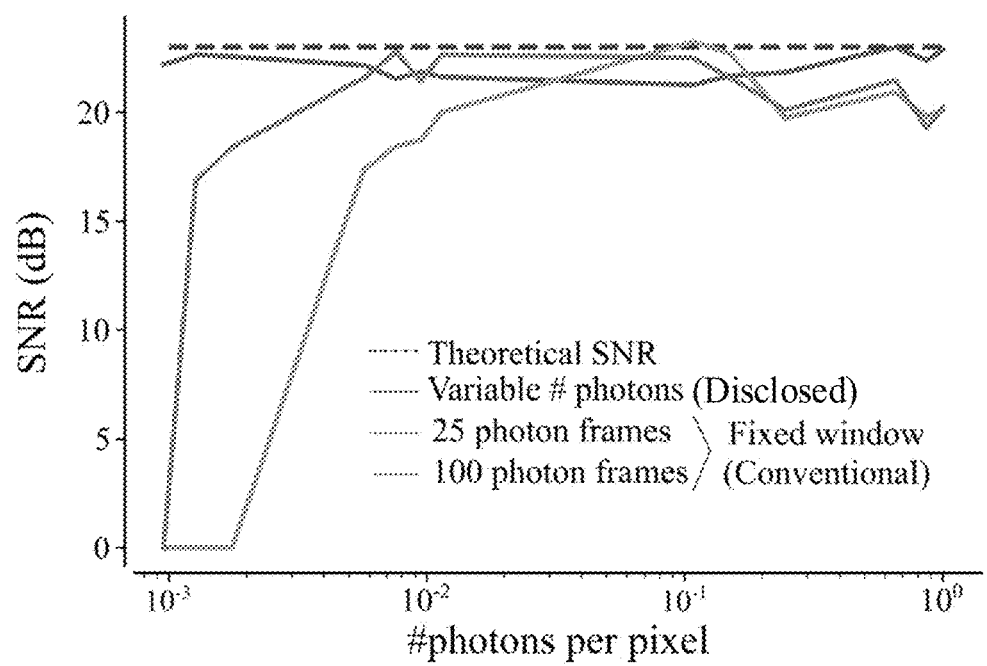

FIG. 6 shows an example of a scene, images of the scene generated using various techniques including techniques described herein, and signal to noise ratio of various techniques at different levels of scene brightness. FIG. 6, panel (a) shows: a still image from a ground truth video of a rotating orange used to create simulated SPAD photon frames; a simulated single long exposure image of the rotating orange, which is quite blurry; a simulated single short exposure image of the rotating orange which has low contrast and is very noisy; and a deblurred image generated using mechanisms described herein (labeled "disclosed" in FIG. 6, panel (a)), which strikes a balance between noise and blur to get a sharp high-quality image.

Starting with a ground truth high resolution, high frame rate video (e.g., generated from a static image of an orange), the video frames were scaled to units of photons per second and photon frames were generated using exponentially distributed arrival times. A photon frame readout from a SPAD array with 8000 bins and bin width of 256 picoseconds was modeled. The rotating orange image data was simulated by applying successive known rigid transformations to a static image, and SPAD data was generated by scaling the transformed images between $10^4$ and $10^8$ photons per second. The image was rotated by 0.1° for every 10 generated photons for a total of 1000 photons. The BOTTOMUP algorithm with penalty term λ=5 was used for changepoint identification to generate the deblurred image using mechanisms described herein.

FIG. 6, panel (b) shows signal to noise ratio (SNR) of deblurred images generated from the orange scene shown in FIG. 6, panel (a), with varied brightness values generated using mechanisms described herein (labeled "disclosed") and using conventional techniques that use a fixed frame rate using two different window lengths for comparison. The SNR of the deblurred images was calculated over a range of flux levels using the l2 (root-mean-squared) distance from the ground truth to the value in the deblurred image. The total number of photons captured was kept approximately constant by extending the capture time for dimmer flux levels. As shown in FIG. 6, panel (b), deblurred images generated using mechanisms described herein dynamically adapted to motion and lighting, and thus was able to reconstruct a deblurred image with high SNR even in photon-starved regimes where the SNR of the fixed window techniques degrades rapidly. As shown in FIG. 6, panel (b), deblurred images generated based on changepoint video data stay above 20 dB at all photon rates, while the SNR associated with the deblurred images generated using the fixed photon window decrease as photon count decreases.

Figure 7:
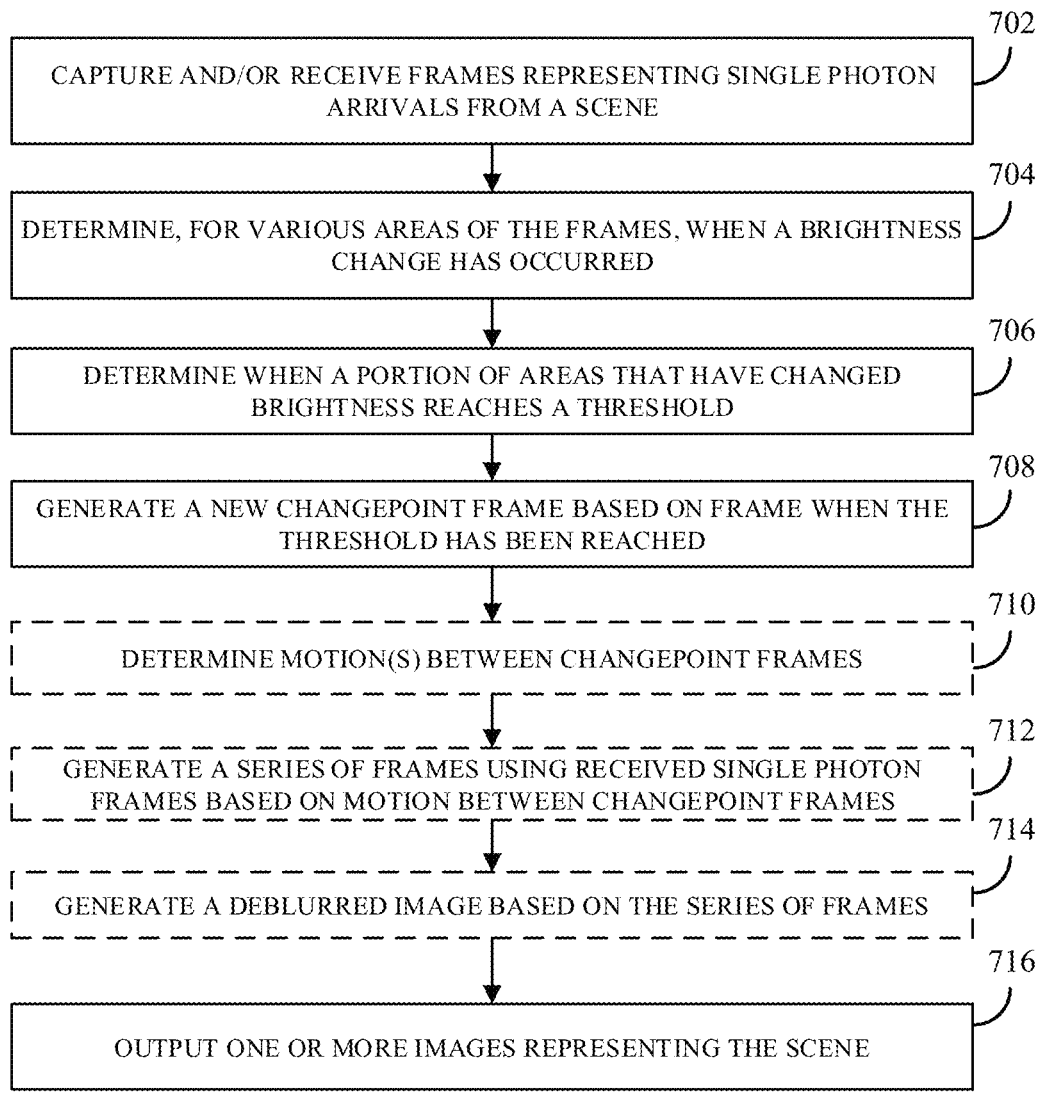
FIG. 7 shows an example of a process for adaptive imaging using single-photon image sensor data in accordance with some embodiments of the disclosed subject matter.

FIG. 7 shows an example 700 of a process for adaptive imaging using single-photon image sensor data in accordance with some embodiments of the disclosed subject matter.

At 702, process 700 can capture a sequence of photon frames of a scene (e.g., frames in which pixels are associated with photon arrival times, binary frames, etc.) using any suitable image sensor. For example, as described above in connection with FIGS. 1 and 4, the image sensor can be a SPAD-based image sensor, or a jot-based image sensor. However, these are merely examples, and mechanisms described herein can be used to generate high quality, high dynamic range images using any sensor that include single photon detectors. Additionally or alternatively, in some embodiments, at 702, process 700 can receive a sequence of photon frames of a scene from another device (e.g., a device including a suitable image sensor). For example, in some embodiments, at least a portion of process 700 can be executed by image data source 302, which can capture a sequence of photon frames of a scene using an image sensor. As another example, a portion of process 700 can be executed by computing device 310 and/or server 320, which can receive a sequence of photon frames from image data source 302 (e.g., from a camera that captured the photon frames, from memory of image data source 302 which may or may not be implemented as a camera, etc.).

In some embodiments, process 700 can cause the sequence of frames to be captured at any suitable frame rate and/or within any suitable time budget. For example, process 700 can cause the sequence of frames to be captured with a high frame rate in situations where there is likely to be scene motion and/or high scene intensity. In a more particular example, the frame rate can set between about 300 fps and about 100,000 fps for current SPAD-based image sensors. As another more particular example, the frame rate can set between about 30 fps and about 1,000 fps for current jot-based image sensors.

In some embodiments, a total time budget (e.g., T) can be in a range from about 1 millisecond to about 1 second. In a particular example, the total time budget can be in a range from about 10 milliseconds to about 1 second for scenes with relatively high dynamic range. In some embodiments, the total time budget can be constrained based on the amount of motion in the scene, as it is more difficult to generate a high quality image for scenes with more motion for longer time budgets and/or more photon frames, especially if an object moves outside of the scene during the time budget. Additionally, in some embodiments, the total time budget can be constrained based on the amount of available memory, as a longer time budget and/or more photon frames requires additional memory availability that can be written to at speeds that are comparable to the frame rates of the image sensor.

In some embodiments, the total time budget can be omitted, and a stream of photon frames can be captured, with a sequence of photon frames corresponding to a particular time period selected after the frames have already been captured. For example, process 700 can cause photon frames of a scene to be captured continuously, and a sequence of frames can be selected from the continuously captured sequence at any suitable time for use in generating an changepoint data and/or deblurred images.

At 704, process 700 can determine, for various areas (e.g., pixels, groups of pixels) of the frame, when a brightness change has occurred. In some embodiments, process 700 can use any suitable technique or combination of techniques to determine when a changepoint (e.g., a brightness change) has occurred. For example, as described above in connection with FIG. 1, process 700 can analyze a series (e.g., a timeseries) of datapoints, and estimate when a change from one relatively steady state to a new relatively steady state. In a more particular example, process 700 can use techniques described above in connection with EQ. 2 to identify changepoints in a set of datapoints (e.g., corresponding to time budget 7). As another more particular example, process 700 can use techniques described in Appendix A to identify changepoints in a set of datapoints (e.g., corresponding to a portion of time budget 7).

In some embodiments, process 700 can generate a continuous-time piecewise function that can be used to determine the estimated flux associated with an area of the image sensor (e.g., a pixel, a group of pixels) at any particular time. Additionally or alternatively, in some embodiments, process 700 can store the location of changepoints, and estimated flux associated with the changepoints (e.g., at tuples associated with a particular pixel or group of pixels). In some embodiments, estimated flux can be stored using any suitable technique. For example, estimated flux can be stored using estimated flux values. In such an example, estimated flux can be stored using any suitable number of bits, with 0 corresponding to black and a maximum value corresponding to white. As another example, estimated flux can be stored as an estimated number of photons per second (e.g., as a floating point number). As yet another example, estimated flux can stored using one or more delta values indicating a change in brightness from a previous estimated flux (e.g., prior to a most recent changepoint).

At 706, process 700 can determine when a portion of image areas that have changed from a previous frame changepoint has reached a threshold using any suitable technique or combination of techniques, such as techniques described above in connection with FIG. 1. For example, process 700 can determine when a number of changepoints have occurred for since a previous frame changepoint, and when the number reached a threshold portion (e.g., 1%, 5%, etc.) of the number of image areas (e.g., number of pixels), process 700 can determine that the threshold has been reached. In such an example, the total number of image areas that have contributed at least one changepoint may not reach the threshold, as some pixel areas may contribute multiple changepoints (e.g., quickly varying portions of the scene), while others may contribute only one changepoint.

As another example, process 700 can determine when a threshold number of image areas have accumulated at least one changepoint. In such an example, the total number of image areas that have contributed at least one changepoint can be expected to equal the threshold.

In some embodiments, process 700 can evaluate multiple portions of the scene (e.g., using a patch-based approach), and can determine when a threshold number of image areas within each patch have changed from a previous frame.

In some embodiments, process 700 can determine when a portion of image areas that have changed from a previous frame changepoint has reached a threshold at various points in time (e.g., corresponding to a single photon frame, corresponding to multiple photon frames) after a previous frame changepoint was identified and/or when an evaluation period begins. In such an example, process 700 can evaluate, for each image area, whether the estimated steady state flux has changed.

In some embodiments, process 700 can compare a value associated with the image area at a beginning of an evaluation period (e.g., corresponding to a beginning of a time budget T, corresponding to a time associated with a previous changepoint image) to a value associated with the image area at a current time. In such embodiments, when a threshold number of image areas have a different value, process 700 can determine that a threshold portion of the scene has changed.

In some embodiments, process 700 can compare a value associated with the image area at a beginning of an evaluation period or at a previous changepoint to a value associated with the image area at a current time. In such embodiments, when a threshold number of changepoints have occurred regardless of how many image areas have a different value, process 700 can determine that a threshold portion of the scene has changed.

In some embodiments, when the value has changed for a particular image area, process 700 can indicate that the image area has changed (e.g., using a flag, a bit in a bitmask, etc.). In such embodiments, when a threshold number of image areas have changed in value, process 700 can determine that a threshold portion of the scene has changed.

In some embodiments, process 700 can determine, for each image area, whether a changepoint exists between a beginning of an evaluation period and a particular time. In such embodiments, when a threshold number of image areas have changed in value based on the presence of a changepoint, process 700 can determine that a threshold portion of the scene has changed.

In some embodiments, changepoints (e.g., identified at 706) and estimated flux between changepoints (e.g., estimated at 704) associated with areas of the image sensor can be stored using any suitable technique or combination of techniques. For example, process 700 can associate, with each pixel, a list of values corresponding to changepoints, and an estimated flux between each changepoint. In a more particular example, process 700 can generate a list of values corresponding to pixel changepoints identified at 706, and can generate a list of flux estimates for times between the changepoints points. In such an example, such a list can be associated with each pixel or group of pixels, which can be used to determine an amount of motion represented by a period of time within total time budget T.

At 708, process 700 can generate changepoint frames corresponding to a photon frame when the threshold has been reached at 706. In some embodiments, process 700 can determine a value for each image area (e.g., pixel, group of pixels) based on an estimated flux at a time associated with the changepoint frame. For example, as described above, and shown in FIGS. 1 and 2, each time can be associated with a steady-state flux. In such an example, process 700 can use the steady-state flux at a point in time corresponding to the changepoint frame to determine a flux value for the changepoint frame.

In some embodiments, process 700 can generate changepoint frames at 708 serially (e.g., each time a threshold portion of the scene has changed at 706, process 700 can initiate generation of a changepoint frame), and/or in parallel (e.g., after identifying multiple times at which a threshold portion of the scene has changed at 706).

In some embodiments, process 700 can format the changepoint frames as a series of frames (e.g., a video, such as video 108) at 708. For example, process 700 can concatenate the changepoint frames. As another example, process 700 can generate a video in any suitable format.

At 710, process 700 can determine motion between changepoint frames using any suitable technique or combination of techniques. For example, process 700 can use techniques described above in connection with FIG. 1 (e.g., in connection with 110), such as correlation-based image registration between consecutive changepoint, patch-wise alignment techniques, etc. As another example, process 700 can use techniques described above in connection with FIG. 6. As yet another example, process 700 can use techniques described below in connection with FIG. 8.

At 712, process 700 can generate a series of frames using photon frames captured and/or received at 702 and motion information determined at 710. In some embodiments, process 700 can use any suitable technique to generate deblurred frames at 712. For example, process 700 can use techniques described above in connection with 112 and 114 of FIG. 1.

In some embodiments, process 700 can upsample image data from the photon frames to generate higher resolution image data using motion data using any suitable technique or combination of techniques. For example, process 700 can use a zero order hold technique to upsample image data based on motion information (e.g., along the direction of motion). As another example, process 700 can use a trained machine learning model (e.g., neural network) technique to upsample image data based on motion information.

At 714, process 700 can generate a deblurred image based on the series of deblurred frames using any suitable technique or combination of techniques. For example, process 700 use techniques described above in connection with 116 of FIG. 1.

In some embodiments, 710, 712, and/or 714 can be omitted. For example, in some embodiments, if process 700 is configured to output a series of changepoint frames (e.g., to a machine vision system), process 700 can omit 710 to 714. As another example, in some embodiments, if process 700 is configured to output a series of changepoint frames and motion information (e.g., to a portion of image processing system 104 executed by another device), process 700 can omit 712 and 714. As yet another example, in some embodiments, if process 700 is configured to output a series of deblurred frames (e.g., a deblurred video), process 700 can omit 714.

Figure 8:
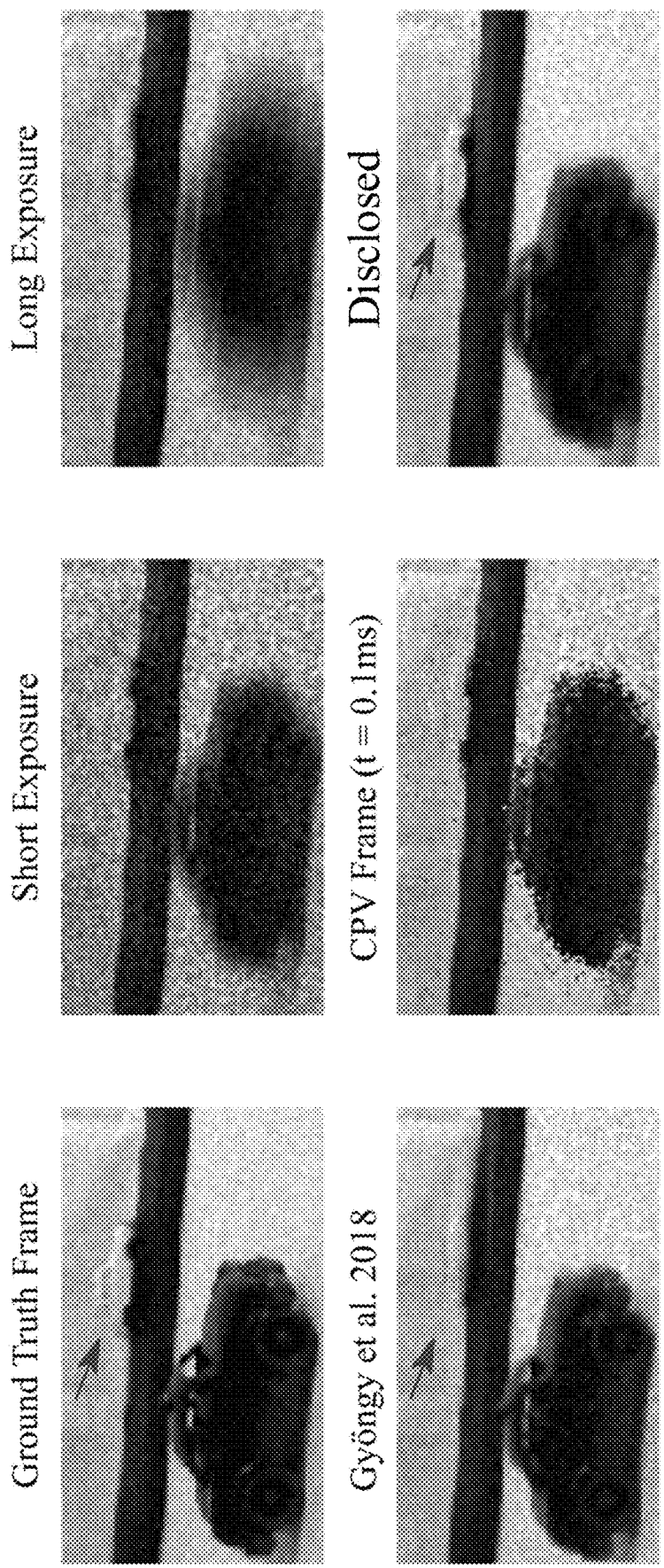
FIG. 8 shows an example of a scene including moving objects, and images of the scene generated using various techniques, including techniques described herein.

FIG. 8 shows an example of a scene including moving objects, and images of the scene generated using various techniques, including techniques described herein. In some embodiments, mechanisms described herein can deblur image data depicting multiple objects moving at different velocities. For example, as shown in FIG. 8, mechanisms described herein can deblur data depicting multiple objects moving with respect to a static background. In some embodiments, mechanisms described herein can cluster changepoints using a density-based spatial clustering algorithm (DBSCAN) (e.g., as described in Ester et al., "A density-based algorithm for discovering clusters in large spatial databases with noise," In Proceedings of the Second International Conference on Knowledge Discovery and Data Mining (1996)), which can result in clusters being associated with different objects. For example, mechanisms described herein can attempt to identify pixels with changepoints that occur in relatively close proximity in time and space.

For each cluster, a bounding box can be created in the image data that includes pixels depicting a particular object. As the object moves, the bounding can be moved with respect to the image, such that the bounding box includes pixels corresponding to the particular object. Such techniques can facilitate isolation of different moving objects in the scene. In some embodiments, any suitable technique can be used in connection with determining the motion of each object individually (e.g., in connection with pixels that fall within the bounding box at any given time). Mechanisms described herein can then stitch together data associated with each object with the areas that are relatively static in the changepoint data. Additionally, in some embodiments, clustering the changepoint data step also acts as a denoiser by rejecting spurious changepoints that do not belong to any cluster.

Figure 9:
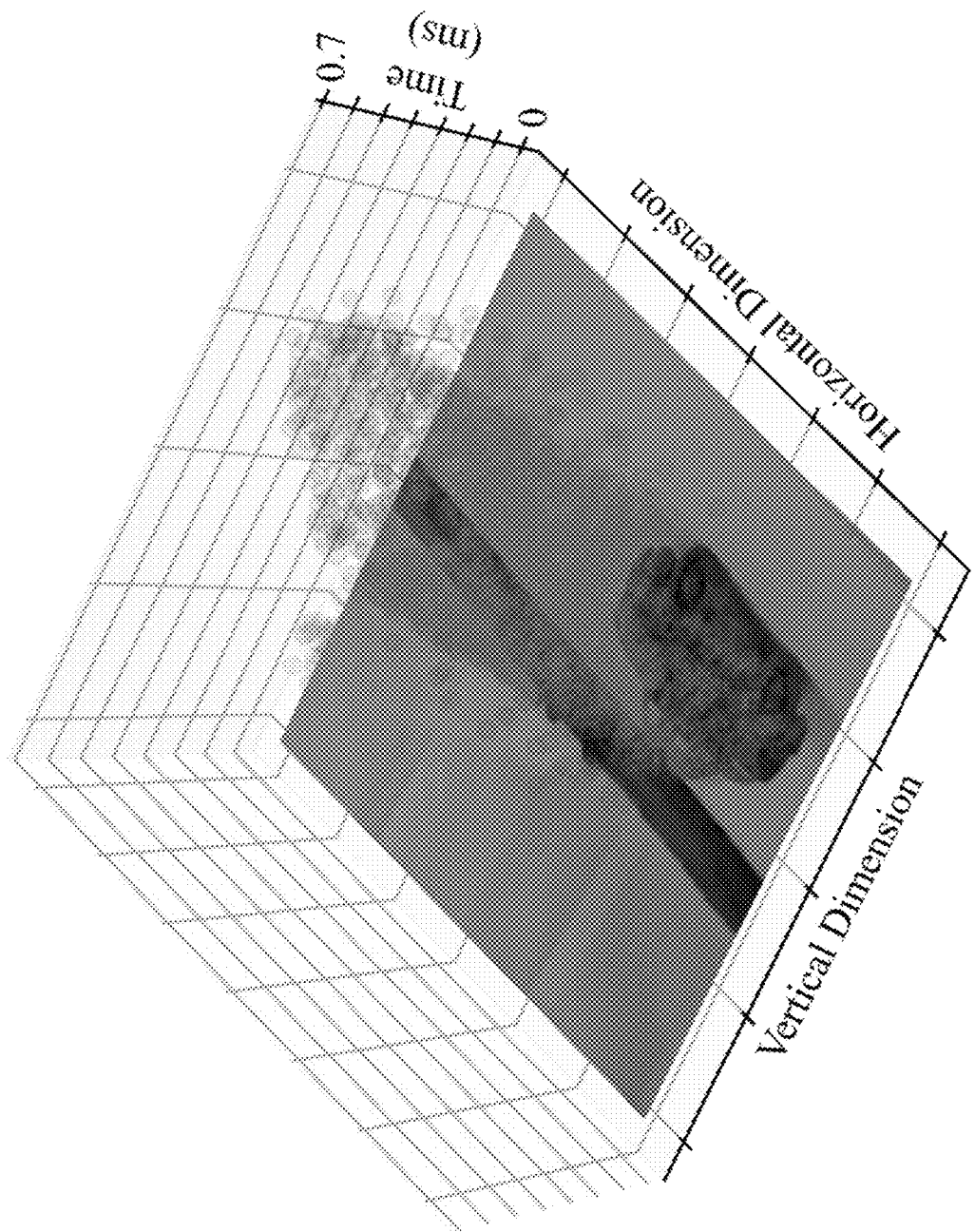
FIG. 9 shows an example of clustered flux change points in space and time that can be used to segment objects in a scene from a scene background in accordance with some embodiments of the disclosed subject matter.

In the example shown in FIG. 8, starting from a ground truth high resolution, high frame rate video, the video frames were scaled to units of photons per second (based on the flux associated with each pixel), and photon frames were generated using exponentially distributed arrival times. A photon frame readout from a SPAD array was modeled with 8,000 time bins and bin width of 256 ps, corresponding to a frame period $T_{pf}$ of about 2 µs. The ground truth video use to simulate multi-object motion includes two toy cars rolling down a ramp at different speeds. The video frame pixels were then scaled between $10^5$ and $10^6$ photons per second and a total of 690 photon frames were generated. A bright slow-moving car (highlighted by an arrow in FIG. 8 in images in which it is visible) has a contrast of 1.2 with respect to the background, and moves 48 pixels over the duration of video. The dark car has a contrast of 5.0 with the background, and moves 143 pixels over the duration of video. Pixel changepoints were identified from the photon frames using the PELT algorithm with $\lambda=6$, and the DBSCAN clustering algorithm used E=7.5 and MinPts=40. A resulting deblurred image is shown in FIG. 9. As shown in FIG. 8, results generated using a fixed windowing approach discussed in Gyöngy blurs out the low contrast white car in the back of the image. FIG. 8 also shows a short exposure and a long exposure. As shown in FIG. 8, the short exposure is noisy, and the low-contrast white car is not easily distinguished from the background, and details of the black car are similarly not easily distinguished. In the long exposure, the black car is blurred, and the white car is difficult to locate against the background. A single changepoint frame is included in FIG. 1, corresponding to steady state values of the series of photon frames at a time of 0.1 microseconds.

Mechanisms described herein can assign dynamically changing integration windows extracted from the changepoint data to successfully recover both cars simultaneously with negligible motion blur. The changepoint clusters used for segmenting cars from the static background in our method are shown in FIG. 9.

FIG. 9 shows an example of clustered flux change points in space and time that can be used to segment objects in a scene from a scene background in accordance with some embodiments of the disclosed subject matter.

As shown in FIG. 9, two clusters of flux changepoints were identified from the photon frames generated in the simulation described above in connection with FIG. 8. In FIG. 9, a single frame of video is shown (corresponding to the beginning of the video), with flux changepoints plotted with respect to the horizontal (i.e., x) and vertical (i.e., y) axes of the image sensor, as well as being plotted with respect to the time in the video at which the flux changepoint occurred.

Figure 10:
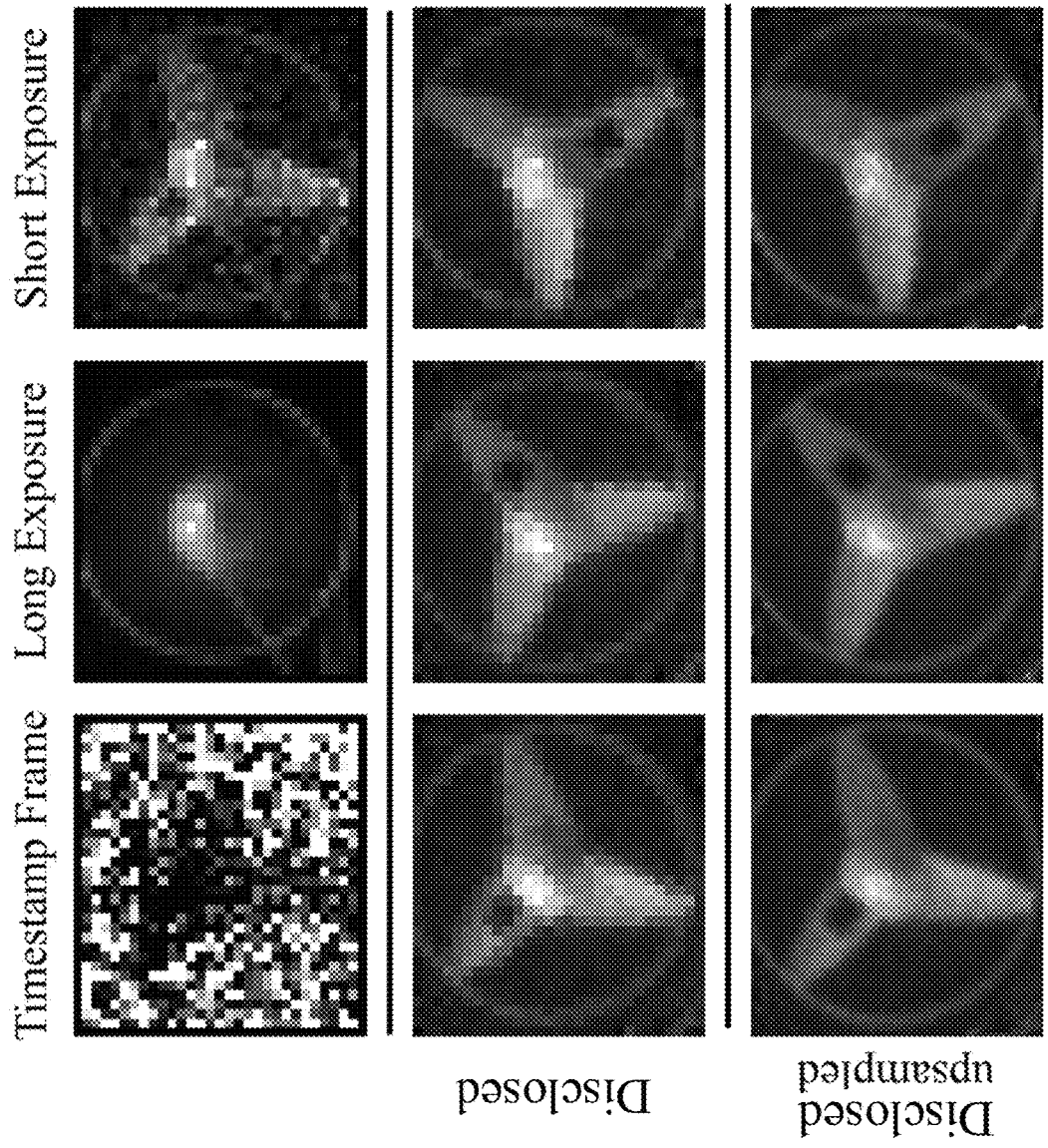
FIG. 10 shows examples of deblurred images of a scene generated using techniques described herein.

FIG. 10 shows examples of deblurred images of a scene generated using techniques described herein.

Mechanisms described herein were evaluated using data captured using a 32×32 array of SPADs implemented using indium-gallium-arsenide (InGaAs) obtained from Princeton Lightwave Inc. The pixels of the array were sensitive to near infrared and shortwave infrared (i.e., in a wavelength range of about 900 nanometers (nm)-1.6 microns (μm)). The SPAD array was operated in a frame readout mode at 50,000 photon frames per second, with each photon frame exposure window at 2 μs, sub-divided into 8000 bins, giving a temporal resolution of about 250 ps per bin.

For this low resolution experimental data, the timestamp frames and the changepoint video data (including changepoints and estimated flux between changepoints) was zero-order hold upsampled before estimating motion in the spatial dimensions (e.g., as described above in connection with 110 of FIG. 1). Photon frames were then upsampled, and integrated using the estimated motion (e.g., as described above in connection with 112 of FIG. 1). Upsampling before motion integration can facilitate photons that are captured in the same pixel to land in a larger space during the motion integration step.

FIG. 10 shows a "fan" scene, which demonstrates performance of techniques described herein when a scene that includes relatively fast rotation. The background behind the fan in the scene was covered with absorbing black felt material. This facilitated treating the data as having global rotation, because there is hardly any light captured from the background. The optimal exposure time in this case depends on the rotation speed. Mechanisms described herein generated deblurred images that preserve details of the fan blades including a small black square patch on one of the fan blades. The top row in FIG. 10 includes a single photon frame, with colors corresponding to a timestamp at which a photon was detected (e.g., as shown in FIG. 2, panel (a)), a long exposure and a short exposure. The middle row includes deblurred images generated from photon frame data at the original resolution, and the bottom row shows the upsampled results.

Figure 11:
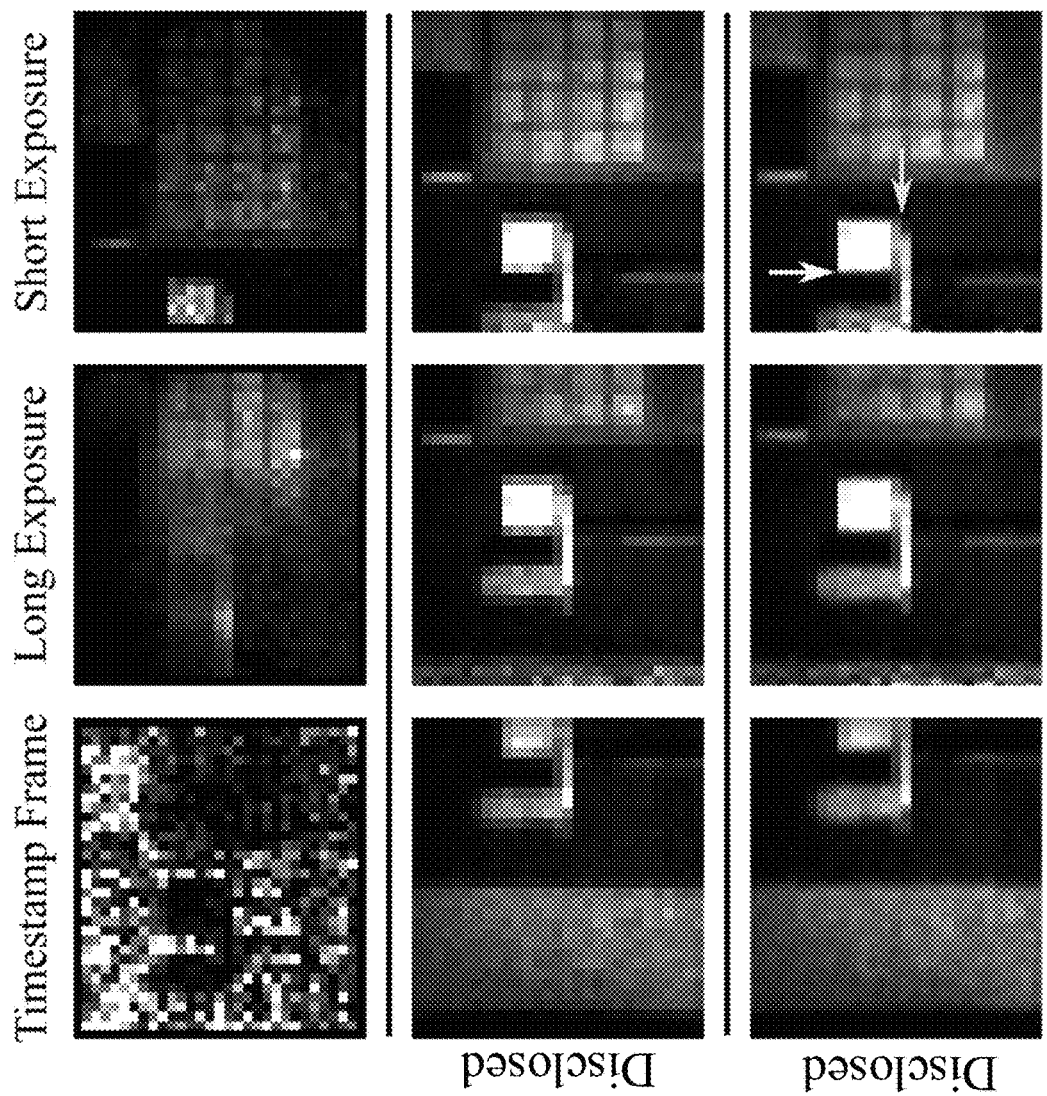
FIG. 11 shows examples of deblurred images of another scene generated using techniques described herein.

FIG. 11 shows examples of deblurred images of another scene generated using techniques described herein.

FIG. 11 shows a "checkerboard" scene shows, and the results in FIG. 11 demonstrate deblurring results with purely horizontal global motion. Note that mechanisms described herein were able to resolve details such as the outlines of the squares on the checkerboard. As in FIG. 10, the top row in FIG. 11 includes a single photon frame, with colors corresponding to a timestamp at which a photon was detected (e.g., as shown in FIG. 2, panel (a)), a long exposure and a short exposure. The middle row includes deblurred images generated from photon frame data at the original resolution, and the bottom row shows the upsampled results.

The "fan" dataset was upsampled 9× compared to the original resolution. The "checkerboard" dataset on the other hand was upsampled 4×. The difference in upsampling rate is because the motion is slower and limited to only the horizontal dimension in the scene of FIG. 11. Note that some of the details in the vertical edges are sharp, but horizontal edges relatively remain blurry.

Additional simulation results and images of the scenes used to generate the results in FIGS. 10 and 11 are described in Appendix A.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the process of FIG. 7 can be executed or performed in any suitable order or sequence not limited to the order and sequence shown and described in the figures. Also, some of the above steps of the process of FIG. 7 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for generating digital images, comprising:
an image sensor comprising a plurality of detectors configured to detect arrival of photons, the plurality of detectors arranged in an array;
at least one processor that is programmed to:
receive, from the image sensor, a series of images, each image in the series of images comprising a plurality of pixels representing brightness of a portion of a scene, each of the plurality of pixels associated with a pixel location (x,y);
identify, for each of the plurality of pixel locations using the series of images, one or more changepoints at which a transition in brightness associated with a pixel between different steady state brightness values occurs;
determine, based on the one or more changepoints associated with the plurality of pixel locations, a first point in the series of images at which at least a threshold portion of the plurality of pixel locations have included at least one changepoint;
generate a first image based on brightness associated with each pixel location at the first point in the series of images;

determine, based on changepoints associated with the plurality of pixel locations, a second point in the series of images at which at least the threshold portion of the plurality of pixel locations have included at least one changepoint that occurred after the first point in the series of images; and generate a second image based on brightness associated with each pixel location at the second point in the series of images.

2. The system of claim 1, wherein each of the plurality of detectors is a single-photon avalanche diode (SPAD).

3. The system of claim 2, wherein each SPAD is configured to record a timestamp at which a single photon was detected.

4. The system of claim 1, wherein the at least one processor is further programmed to:

estimate, for each of the plurality of pixel locations using the series of images, a single brightness value between consecutive changepoints; and generate the first image based on the estimated single brightness value for each of the plurality of pixel locations at the first point in the series of images.

5. The system of claim 1, wherein the at least one processor is further programmed to:

determine motion between at least a portion of the first image and at least a portion of the second image.

6. The system of claim 5, wherein the at least one processor is further programmed to:

generate a deblurred image based on the motion between the first image and the second image and pixel values of each of the series of images.

7. The system of claim 5, wherein the at least one processor is further programmed to:

generate an upsampled image based on the motion between the first image and the second image and pixel values of each of the series of images.

8. The system of claim 1, wherein the at least one processor is further programmed to:

provide the first image and the second image to a machine learning model.

9. The system of claim 1, wherein the threshold portion of the plurality of pixel locations is at least one percent of the plurality of pixel locations.

10. A method for generating digital images, comprising:

receiving, from an image sensor comprising a plurality of detectors configured to detect arrival of photons, a series of images, each image in the series of images comprising a plurality of pixels representing brightness of a portion of a scene, each of the plurality of pixels associated with a pixel location (x,y);

identifying, for each of the plurality of pixel locations using the series of images, one or more changepoints at which a transition in brightness associated with a pixel between different steady state brightness values occurs;

determining, based on the one or more changepoints associated with the plurality of pixel locations, a first point in the series of images at which at least a threshold portion of plurality of pixel locations have included at least one changepoint;

generating a first image based on brightness associated with each pixel location at the first point in the series of images;

determine, based on changepoints associated with the plurality of pixel locations, a second point in the series of images at which at least the threshold portion of the plurality of pixel locations have included at least one changepoint that occurred after the first point in the series of images; and generate a second image based on brightness associated with each pixel location at the second point in the series of images.

11. The method of claim 10, wherein each of the plurality of detectors is a single-photon avalanche diode (SPAD).

12. The method of claim 11, wherein each SPAD is configured to record a timestamp at which a single photon was detected.

13. The method of claim 10, further comprising:

estimating, for each of the plurality of pixel locations using the series of images, a single brightness value between consecutive changepoints; and generating the first image based on the estimated single brightness value for each of the plurality of pixel locations at the first point in the series of images.

14. The method of claim 10, further comprising:

determining motion between the first image and the second image.

15. The method of claim 14, further comprising:

generating a deblurred image based on the motion between the first image and the second image and pixel values of each of the series of images.

16. The method of claim 14, further comprising:

generating an upsampled image based on the motion between the first image and the second image and pixel values of each of the series of images.

17. The method of claim 10, further comprising:

providing the first image and the second image to a machine learning model.

18. The method of claim 10, wherein the threshold portion of the plurality of pixel locations is at least one percent of the plurality of pixel locations.

19. A system for generating digital images, comprising:

an image sensor comprising a plurality of single-photon detectors configured to detect arrival of photons, the plurality of single-photon detectors arranged in an array;

at least one processor that is programmed to:

receive a sequence of photon frames, each photon frame comprising a plurality of pixels having a value indicative of whether a photon was received during an associated frame period, wherein each of the plurality of pixels corresponds to a pixel location of a plurality of pixel locations;

identify, for each of the plurality of pixel locations, a plurality of changepoints, each of the plurality of changepoints is indicative of a change in scene brightness;

identify a photon frame in the sequence of photon frames at which at least a threshold change in brightness has occurred based on the changepoints associated with each of the plurality of pixel locations; and generate a series of changepoint frames, wherein each changepoint frame is based on estimated brightness associated with each pixel location at a point in the sequence of photon frames.

20. The system of claim 19, wherein the at least one processor that is further programmed to:

identify each of plurality of changepoints using no information from photon frames following a photon frame corresponding to the respective changepoint in the sequence.

* * * * *

UNITED STATES PATENT AND TRADEMARK OFFICE
CERTIFICATE OF CORRECTION

| | |
|---|---|
| PATENT NO. | : 11,539,895 B1 |
| APPLICATION NO. | : 17/485978 |
| DATED | : December 27, 2022 |
| INVENTOR(S) | : Trevor Seets et al. |

It is certified that error appears in the above-identified patent and that said Letters Patent is hereby corrected as shown below:

In the Specification

Column 9, Line 63, "Here A" should be --Here $\lambda$--.

Column 20, Line 2, "the l2" should be --the $\ell 2$--.

Column 21, Line 25, "budget 7" should be --budget T--.

Column 21, Line 28, "budget 7" should be --budget T--.

Signed and Sealed this
Twenty-first Day of March, 2023

Katherine Kelly Vidal
*Director of the United States Patent and Trademark Office*